(12) United States Patent
Tanaka et al.

(10) Patent No.: US 10,678,379 B2
(45) Date of Patent: *Jun. 9, 2020

(54) BEZEL-LESS ACOUSTIC TOUCH APPARATUS

(71) Applicant: Elo Touch Solutions, Inc., Milpitas, CA (US)

(72) Inventors: Yoshikazu Tanaka, Yokohama (JP); Ting Gao, Sunnyvale, CA (US); Joel C. Kent, Fremont, CA (US); Jeffrey T. Haller, Redwood, CA (US); Daniel H. Scharff, San Leandro, CA (US); Timothy O. Avery, Los Gatos, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/274,295

(22) Filed: Sep. 23, 2016

(65) Prior Publication Data

US 2017/0010755 A1  Jan. 12, 2017

Related U.S. Application Data

(63) Continuation of application No. 14/055,797, filed on Oct. 16, 2013, now Pat. No. 9,552,106, which is a
(Continued)

(51) Int. Cl.
*G06F 3/043* (2006.01)
*G06F 3/041* (2006.01)

(52) U.S. Cl.
CPC .......... *G06F 3/0436* (2013.01); *G06F 3/0416* (2013.01)

(58) Field of Classification Search
CPC .............. G06F 3/0416; G06F 3/0436
(Continued)

(56) References Cited

U.S. PATENT DOCUMENTS 3,673,327 A  6/1972 Ralph et al.
4,642,423 A  2/1987 Adler
(Continued)

FOREIGN PATENT DOCUMENTS

CN  1242096 A  1/2000
CN  1320234 A  10/2001
(Continued)

OTHER PUBLICATIONS

English-language Abstract of Taiwanese Patent Application Publication No. 200424916 A; 1 page.
(Continued)

*Primary Examiner* — Kwin Xie
(74) *Attorney, Agent, or Firm* — Sterne, Kessler, Goldstein & Fox P.L.L.C.

(57) ABSTRACT

An acoustic touch apparatus is provided that includes a substrate capable of propagating surface acoustic waves, such as Rayleigh-type or Love-type waves. The substrate has a front surface, a back surface, and a curved connecting surface formed between the front surface and the back surface. The apparatus also includes at least one acoustic wave transducer and at least one reflective array, the acoustic wave transducer and the reflective array behind the back surface of the substrate. The acoustic wave transducer is capable of transmitting or receiving surface acoustic waves to or from the reflective array. The reflective array is capable of acoustically coupling the surface acoustic waves to propagate from the back surface and across the front surface via the curved connecting surface. Various types of acoustic
(Continued)

touch apparatus with edge sensitive touch functions can be provided, according to specific embodiments.

20 Claims, 19 Drawing Sheets

Related U.S. Application Data continuation of application No. 13/012,513, filed on Jan. 24, 2011, now Pat. No. 8,576,202, which is a continuation-in-part of application No. 12/732,132, filed on Mar. 25, 2010, now abandoned.

(58) Field of Classification Search
USPC .......................................................... 345/177
See application file for complete search history.

(56) References Cited

U.S. PATENT DOCUMENTS

| | | | |
|---|---|---|---|
| 4,644,100 A | 2/1987 | Brenner et al. | |
| 4,645,870 A | 2/1987 | Adler | |
| 4,700,176 A | 10/1987 | Adler | |
| 4,746,914 A | 5/1988 | Adler | |
| 4,880,665 A | 11/1989 | Adler et al. | |
| RE33,151 E | 1/1990 | Adler | |
| 5,072,427 A | 12/1991 | Knowles | |
| 5,162,618 A | 11/1992 | Knowles | |
| 5,177,327 A | 1/1993 | Knowles | |
| 5,591,945 A | 1/1997 | Kent | |
| 5,638,093 A * | 6/1997 | Takahashi | G06F 3/0436 178/19.02 |
| 5,739,479 A | 4/1998 | Davis-Cannon et al. | |
| 5,854,450 A | 12/1998 | Kent | |
| 6,091,406 A | 7/2000 | Kambara et al. | |
| 6,225,985 B1 | 5/2001 | Armstrong et al. | |
| 6,567,077 B2 | 5/2003 | Inoue et al. | |
| 6,636,201 B1 | 10/2003 | Gomes et al. | |
| 6,723,929 B2 | 4/2004 | Kent | |
| 6,897,852 B2 | 5/2005 | Grosfeld et al. | |
| 6,922,642 B2 * | 7/2005 | Sullivan | G06F 3/043 702/150 |
| 7,511,711 B2 | 3/2009 | Ing et al. | |
| 7,798,889 B2 | 9/2010 | Nakiri et al. | |
| 8,243,048 B2 | 8/2012 | Kent et al. | |
| 8,427,423 B2 | 4/2013 | Tsumura | |
| 8,576,202 B2 * | 11/2013 | Tanaka | G06F 3/0416 345/177 |
| 2002/0005838 A1 * | 1/2002 | Inoue | G06F 3/0436 345/173 |
| 2002/0103433 A1 | 8/2002 | Muramatsu | |
| 2003/0184514 A1 | 10/2003 | Grosfeld et al. | |
| 2005/0012724 A1 | 1/2005 | Kent | |
| 2005/0088417 A1 * | 4/2005 | Mulligan | G06F 3/04886 345/173 |
| 2005/0243071 A1 * | 11/2005 | Kent | G06F 3/0436 345/177 |
| 2005/0255624 A1 | 11/2005 | Miyajima | |
| 2006/0125804 A1 | 6/2006 | Kent | |
| 2006/0139341 A1 | 6/2006 | Funasaka | |
| 2007/0171212 A1 * | 7/2007 | Sakurai | G06F 3/0412 345/177 |
| 2008/0094594 A1 | 4/2008 | Shibazaki | |
| 2008/0100594 A1 | 5/2008 | Tsumura | |
| 2008/0261057 A1 * | 10/2008 | Slobodin | G02F 1/133308 428/447 |
| 2008/0266266 A1 | 10/2008 | Kent et al. | |
| 2009/0027816 A1 | 1/2009 | Kim et al. | |
| 2009/0257207 A1 | 10/2009 | Wang et al. | |
| 2010/0253641 A1 | 10/2010 | Swedin | |
| 2014/0176508 A1 | 6/2014 | Tanaka et al. | |

FOREIGN PATENT DOCUMENTS

| | | |
|---|---|---|
| CN | 101167044 A | 4/2008 |
| EP | 1107102 A1 | 6/2001 |
| EP | 1847914 A1 | 10/2007 |
| EP | 1950793 A1 | 7/2008 |
| EP | 2083349 A1 | 7/2009 |
| JP | 2000066838 A | 3/2000 |
| JP | 2002540535 A | 11/2002 |
| JP | 2003296023 A | 10/2003 |
| JP | 2006195763 A | 7/2006 |
| JP | 2006343920 A | 12/2006 |
| JP | 2007533040 A | 11/2007 |
| JP | 2010525485 A | 7/2010 |
| KR | 20000017320 A | 3/2000 |
| RU | 2006116510 A | 11/2007 |
| RU | 2353002 C2 | 4/2009 |
| TW | 200424916 A | 11/2004 |
| WO | WO 9402911 A1 | 2/1994 |
| WO | WO 98/29853 | 7/1998 |
| WO | WO 0157636 A1 | 8/2001 |
| WO | WO 2005006242 A2 | 1/2005 |
| WO | WO 2005103873 A2 | 11/2005 |

OTHER PUBLICATIONS

Communication Pursuant to Article 94(3) EPC, dated Jan. 29, 2015 for European Patent Application No. 11714149, 12 pages.
English language abstract of Japanese Patent Application Publication No. 2006-343920, 2 pages.
English-language abstract of International Patent Application Publication No. 01/57636, 2 pages.
International Search Report and Written Opinion for Application No. PCT/US2011/028463, dated Jun. 15, 2011, 9 pages.
Viktorov, I.A., "Rayleigh and Lamb Waves: Physical Theory and Applications," pp. 41-47, Plenum Press, New York (1967).
News release (Aug. 27, 2008) re Acoustic Pulse Recognition zero-bezel touchscreen monitor introduction by Tyco Electronics' Elo TouchSystems business.
U.S. Appl. No. 12/732,132 "Bezel-Less Acoustic Touch Apparatus" Tanaka et al. filed Mar. 25, 2010.
English-language abstract of Japanese Patent Application No. 2007533040 A, 1 page.
Office Action dated Feb. 10, 2014 directed to related Russian Patent Application No. 2012145348, with English-language translation; 9 pages.
Office Action dated Mar. 23, 2015 directed to related Chinese Patent Application No. 201180020854.0, with English-language translation; 13 pages.
Office Action dated Oct. 29, 2013 directed to related Japanese Patent Application No. 2013-501300, with English-language translation; 4 pages.
Office Action dated Oct. 30, 2013 directed to related Korean Patent Application No. 10-2012-7027789, with English-language translation; 10 pages.
English-language abstract of Russian Patent No. 2353002 C2, published Apr. 20, 2009; 1 page.

* cited by examiner

BEZEL-LESS ACOUSTIC TOUCH APPARATUS

CROSS REFERENCE TO RELATED APPLICATIONS

This application is a continuation of U.S. patent application Ser. No. 14/055,797 filed on Oct. 16, 2013, which is a continuation of U.S. patent application Ser. No. 13/012,513 filed on Jan. 24, 2011 (now U.S. Pat. No. 8,576,202), which is a continuation-in-part of U.S. patent application Ser. No. 12/732,132 filed on Mar. 25, 2010 (now abandoned), the disclosures of which are incorporated by reference herein in their entireties.

FIELD OF THE INVENTION

The present invention relates to the field of acoustic touch sensor systems, and more particularly to surface acoustic wave touch screens, touch monitors or touch computing devices.

BACKGROUND

Touch sensor systems, such as touch screens or touch monitors, can act as input devices for interactive computer systems used for applications such as information kiosks, computers, order entry systems for restaurants, video displays or signage, mobile devices, etc. Touch sensor systems or touch screens may be integrated into a computing device, thus providing interactive touch capable computing devices, including computers, video displays or signage, or mobile devices.

The dominant touch sensor technologies are resistive, capacitive, and acoustic. Acoustic touch sensors, such as ultrasonic touch sensors using surface acoustic waves, are particularly advantageous when the application demands a very durable touch sensitive surface and minimal optical degradation of the displayed image.

Many types of acoustic touch sensors exist. For example, one type of acoustic touch screen includes a touch substrate having an array of transmitters positioned along a first peripheral surface of a substrate for simultaneously generating parallel surface bound or plate waves that directionally propagate through the panel to a corresponding array of detectors positioned opposite the first array on a second peripheral surface of the substrate. Another pair of transducer arrays is provided on the substrate surface at right angles to the first set. Touching the substrate surface at a point causes an attenuation of the waves passing through the point of touch, thus allowing interpretation of an output from the two sets of transducer arrays to indicate the coordinates of the touch. This type of acoustic touch position sensor is shown in WO 94/02911 (Toda), incorporated herein by reference.

Another example of an acoustic touch sensor system, termed the Adler-type acoustic touch screen, efficiently employs transducers, by spatially spreading the signal and analyzing temporal aspects of perturbation as indicative of position. A typical rectangular touch screen thus includes two sets of transducers, each set having a different axis aligned respectively with the axes of a physical Cartesian coordinate system defined by a substrate. An acoustic pulse or pulse train is generated by one transducer, propagating as, e.g., a narrow Rayleigh wave along an axis which intersects an array of reflective elements, each element angled at 45° and spaced corresponding to an integral number of wavelengths of the acoustic wave pulse. Each reflective element in the array reflects a portion of the wave along a path perpendicular to the axis, across a broad touch region on the front surface of a substrate adapted for touch sensing, to an opposing reflective array and transducer which is a mirror image of the first array and transducer, while allowing a portion to pass to the next reflective element of the array. The transducer of a mirror image array receives an acoustic wave consisting of superposed portions of the incrementally varying wave portions reflected by the reflective elements of both arrays, directed antiparallel to the emitted pulse. The acoustic waves are thus collected, while maintaining the time dispersion information which characterizes the coordinate position from which an attenuated wave originated. Wave paths in the active region of the sensor have characteristic time delays, and therefore a wave path or wave paths attenuated by an object touching the touch sensitive region may be identified by determining a timing of an attenuation in the composite returning waveform. A second set of arrays and transducers are provided at right angles to the first, and operate similarly. Since the axis of a transducer corresponds to a physical coordinate axis of the substrate, the timing of an attenuation in the returning wave is indicative of a Cartesian coordinate of a position on the substrate. The coordinates are determined sequentially to determine the two dimensional Cartesian coordinate position of the attenuating object. The system operates on the principle that a touch on the surface attenuates surface bound or plate waves having a power density at the surface. An attenuation of a wave traveling across the substrate causes a corresponding attenuation of waves impinging on the receive transducer at a characteristic time period. Thus, the controller need only detect the temporal characteristics of an attenuation to determine the coordinate position. Measurements are taken along two axes sequentially in order to determine a Cartesian coordinate position. It is also known to take advantage of acoustic wave guiding effects to reduce border widths in Adler-type touch screens. See, U.S. Pat. Nos. 4,642,423; 4,644,100; 4,645,870; 4,700,176; 4,746,914; Re. 33,151; and 6,636,201; each incorporated herein by reference.

These examples of acoustic touch systems typically have a large number of operative elements (either multiple transducers, or a transducer and reflective array) disposed on, and along, the surface of the substrate. In order to prevent damage due to exposure from the environment or external objects, these peripheral operative elements are hidden and protected by a bezel provided over these elements on the front surface of the substrate and sealed, so that only the active touch region on the surface of the substrate is exposed for possible touch input. These types of acoustic touch systems also are limited to processing touch inputs only for the active touch region, which is the part of the transparent touch sensor that is overlying the display under the touch sensor.

In the commercial market for touch system devices, the cosmetic look of the devices as well as the robustness and reliability of feature capabilities of such devices is becoming increasingly important. Various attempts have been made, for example, to minimize the size of the bezel on the periphery of the touch screen in such devices. However, touch devices conventionally still have had a bezel on the front of the device, although the bezel may have been reduced in profile and/or had a thinner border width.

Therefore, it is desired to have bezel-less acoustic touch systems that provide additional touch function features beyond those provided in the active touch region.

SUMMARY OF THE INVENTION

According to a specific embodiment, the present invention provides an acoustic touch apparatus. The apparatus includes a substrate capable of propagating surface acoustic waves. The substrate has a front surface, a back surface, and a curved connecting surface formed between the front surface and the back surface. The device also includes at least one acoustic wave transducer and at least one reflective array. The acoustic wave transducer and reflective array are behind the back surface of the substrate. The acoustic wave transducer is capable of transmitting or receiving surface acoustic waves to or from the reflective array. The reflective array is capable of acoustically coupling the surface acoustic waves to propagate from the back surface and across the front surface of the substrate via the curved connecting surface.

For a full understanding of this and other embodiments of the present invention, reference should now be made to the following detailed description of the various specific embodiments of the invention as illustrated in connection with the accompanying drawings, which are not to scale.

DETAILED DESCRIPTION OF SPECIFIC EMBODIMENTS

The present invention provides a touch sensor apparatus, which may be a touch screen or other touch sensor or touch device (such as a touch computer, touch display or signage, or mobile touch device) in which an acoustic transducer, e.g., a piezoelectric element, is used to produce a "surface acoustic wave", which is used herein to mean a Rayleigh-type wave, Love-type wave, or other surface bound acoustic wave.

Rayleigh waves maintain a useful power density at the touch surface due to the fact that they are bound to the touch surface. A Rayleigh wave is a wave having vertical and transverse wave components with substrate particles moving along an elliptical path in a vertical plane including the axis of wave propagation, and wave energy decreasing with increasing depth in the substrate. Both shear and pressure/tension stresses are associated with Rayleigh waves. Mathematically, Rayleigh waves exist only in semi-infinite media. In realizable substrates of finite thickness, the resulting wave may be more precisely termed a quasi-Rayleigh wave. Here, it is understood that Rayleigh waves exist only in theory and therefore a reference thereto indicates a quasi-Rayleigh wave. For engineering purposes, it is sufficient for the substrate to be 3 or 4 Rayleigh wavelengths in thickness in order to support Rayleigh wave propagation over distances of interest to touch sensor design.

Like Rayleigh waves, Love waves are "surface-bound waves", i.e. waves bound or guided by one surface and unaffected by the substrates other surface provided the substrate is sufficiently thick. In contrast to Rayleigh waves, particle motion for Love waves is horizontal, i.e. parallel to touch surface and perpendicular to the direction of propagation. Only shear stress is associated with a Love wave.

For purposes of this description, Adler-type acoustic touch sensors using Rayleigh-type waves are discussed according to specific embodiments. However, it is recognized that non-Adler-type acoustic touch sensors or acoustic touch sensor using other types of surface acoustic waves, including Love waves, may be used in other embodiments.

Figure 1:
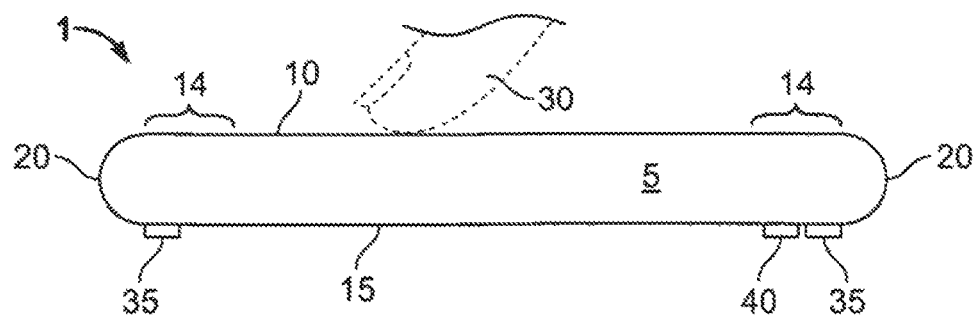
FIG. 1 is a simplified cross-sectional view of an acoustic touch sensor or touch screen, according to a specific embodiment of the invention.
Figure 2A:
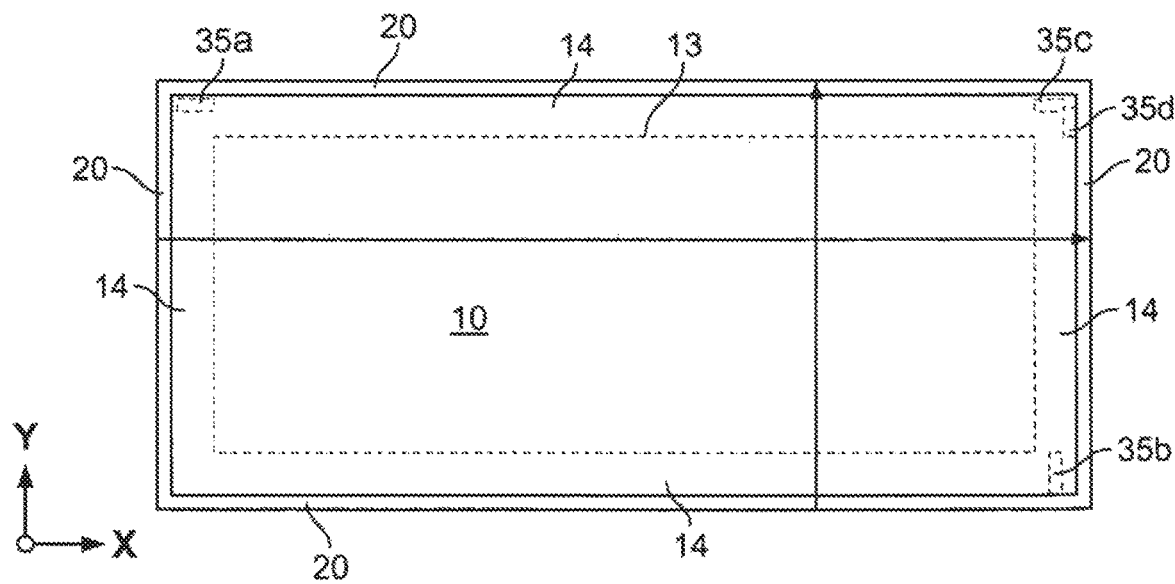
FIG. 2(a) and FIG. 2(b), respectively, are front and back views of the substrate of an acoustic touch sensor, according to a specific embodiment.
Figure 2B:
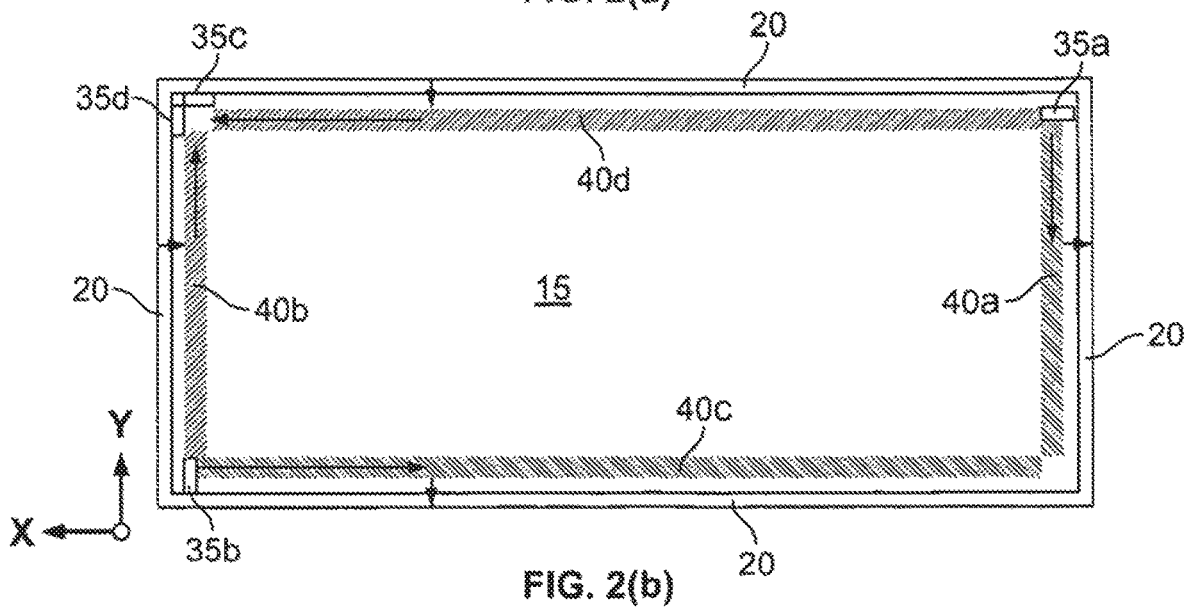

FIG. 1 is a simplified cross-sectional view of an acoustic touch sensor or touch screen 1. FIGS. 2(a) and 2(b), respectively, are front and back views of substrate 5 of an acoustic touch sensor, according to a specific embodiment of the invention. In FIG. 2(a), which is a plan view of front surface 10 of an acoustic touch sensor, transducers 35 are shown in dotted line to provide a frame of reference in relation to FIG. 2(b), which is a plan view of back surface 15 of the acoustic touch sensor where transducers 35 are shown in solid line. To provide a further frame of reference, X-Y coordinate axes are shown in FIGS. 2(a) and 2(b).

As seen in FIG. 1, touch sensor 1 includes a substrate 5 with a front surface 10, a back surface 15, and a curved connecting surface 20 joining the peripheral region 14 of front surface 10 and back surface 15. Curved connecting surface 20 is described further below in connection with FIGS. 3(a)-3(f). Front surface 10 has a nominal touch region 13 on which an object 30 creates a contact to provide input according to the graphical user interface shown on a display (not shown in FIG. 1) disposed behind back surface 15. Nominal touch region 13 is defined herein as the part of front surface 10 which is the inner portion of front surface 10 that is conventionally considered the active touch region for conventional surface acoustic wave touch sensors that is typically not covered by a bezel. Nominal touch region 13 is shown within dotted lines in FIG. 2(a), and peripheral region 14 is the portion of front surface 10 external to nominal touch region 13. In a conventional surface acoustic wave touch sensor, peripheral region 14 on front surface 10 is covered by the bezel. Object 30 is seen in FIG. 1 as a finger, but it is recognized that touches sensed by the acoustic waves may include a stylus pressing against front surface directly or indirectly through a cover sheet or an anti-reflective coating, according to some specific embodiments. Acoustic transducers 35 and reflective element arrays 40 are provided on back surface 15.

According to a specific embodiment, touch sensor 1 is a rectangular shaped touch screen that is generally placed in front of a display device, which faces back surface 15. The touch screen is typically associated with a control system (not shown) having a number of functions. First, an electronic signal is generated, which excites the transducer to generate a surface acoustic wave which subsequently forms the sets of waves. A transducer then receives the sets of waves, and transduces them to an electrical signal. The electrical signal is received, retaining significant information with a relatively high data rate in a low level control system. In many embodiments, it is not necessary to capture phase information contained in the received signals. A controller and/or a processor is thus coupled via wires or leads to the various transducers 35 of touch sensor 1 to control the transmission and reception of the surface acoustic waves and to process the necessary waveform perturbations in order to detect the touch coordinates and position information. The controller, as used herein, means electronics typically including a microprocessor with firmware and analog electronics to generate excitation signals and to receive signals back from the touch screen. The controller and/or a processor maps the touch coordinates and position information to the appropriate control actions of the user interface shown in the display.

The general structure and operation of the invention, according to a specific embodiment, are described further below in connection with FIGS. 1,2(a) and 2(b), and other drawings.

According to specific embodiments of the present invention, substrates may be formed as a flat plate with a rectangular shape or a non-rectangular shape such as a hexagonal plate. In some embodiments, the propagation substrate 5 is composed of a flat panel or a low-curvature panel. Alternatively the substrate may be curved along one or both axes as a cylindrical, spherical or ellipsoidal surface or section surface, or may have other configurations. Large solid angle spherical and complete cylindrical substrates are possible, according to other specific embodiments, where front surface 10 and back surface 15 of substrate 5 would be curved rather than planar or flat. Other embodiments may provide substrate 5 having a cut-out in the center (such as a doughnut or frame-type structure) with curved connecting surfaces 20 on the interior and exterior edges. For example, a polygonal touch sensor may be provided with reflective arrays on each side and transducers at each vertex. This invention is not necessarily limited to standard rectangular sensor geometry. It is noted that, for the purposes of this application, the substrate need not be a single monolithic structure, but rather an acoustically coupled set of elements which may be homogeneous or inhomogeneous (for example, with Love-type waves, a composite substrate with an inner material and an outer material having different densities may be used). The acoustic path from the transmit transducer to the receive transducer may optionally pass through regions of the substrate that were bonded together as part of the fabrication process.

Substrate 5 serves as a propagation medium having surfaces on which surface acoustic waves can be propagated. Although the species of the propagation medium is not particularly limited, a panel in which surface acoustic waves and particularly, ultrasonic surface acoustic waves can be propagated is employed. A display area of the panel includes a touchable coordinate input range, and is generally formed into a laterally symmetrical shape as in the above-mentioned embodiment and particularly, a linearly symmetrical shape (particularly, a rectangular shape). According to specific embodiments, propagation medium substrate 5 constructed as a panel generally has transparency in order to make a display disposed under the touch panel visible.

A preferred propagation medium is transparent and isotropic. For touch screen or touch monitor or touch computer-type devices, suitable glasses for forming the substrate include soda lime glass; boron-containing glass. e.g., borosilicate glass; barium-, strontium-, zirconium- or lead-containing glass; and crown glass, according to various embodiments. Examples of preferred transparent substrates may be B 270™ glass available from Schott, PD200 glass available from Asahi Glass Co., or any glass having low loss of surface acoustic wave propagation resulting in better signals, according to some embodiments.

For other embodiments of touch sensors which are not used as touch screens (for example, an electronic whiteboard application or touch pad), other opaque substrate materials having acceptable acoustic losses may be employed, including but not limited to aluminum and steel. Advantageously, aluminum and some other metals may be coated with an enamel with a relatively slow acoustic phase propagation velocity, thus supporting a Love wave with high touch sensitivity (relative to horizontal shear plate-wave modes) on front surface 10. Under certain conditions, suitable substrates 5 may also be formed of a low-acoustic-loss polymer. Suitable substrates may also be formed from a laminate or other substrate having inhomogeneous acoustic properties. The laminate may advantageously support Love wave propagation with acoustic wave energy concentrated on front surface 10, for example, a laminate of borosilicate glass or Schott B270™ glass and soda lime glass; or enamel on aluminum.

Various types of transducers may be used with the present invention. A transducer is a physical element or set of elements which converts energy from one form to another. This includes converting between acoustic wave modes and converting between electrical and acoustic energy. The acoustically emissive or sensitive structure, which forms part of the acoustic transducer, is typically a piezoelectric element, but is not so limited. For example, electro-acoustic transducers, opto-acoustic transducers, magneto-acoustic transducers, acousto-acoustic transducers (converts energy between one acoustic wave mode and another), and thermo-acoustic transducers, among others, are available and could be used. Preferably, ultrasonic wedge transducers may be disposed on back surface 15 for both transmitting and receiving Rayleigh waves or Love waves. Piezoelectric transducers, such as comb electrode transducers, formed of a rectangular prismatic piezoelectric ceramic having conductors formed on the surface, may be used in some embodiments to acoustically couple to back surface 15 by mounting a flat surface of the ceramic element or metallic electrode formed on back surface 15 of substrate 5. Transducers selected should transmit surface acoustic waves of sufficient magnitude so that the received waves, and the perturbations associated with touches on the particular substrate of particular dimensions, can be adequately detected and coordinate data ascertained.

Arrays 40 of reflective elements have a regular spacing or a spacing increment that can diffract or scatter surface acoustic waves. The known Adler-type touch sensor design employs a reflective array to coherently reflect an acoustic wave at a predetermined angle, where the angle of incidence equals the angle of reflection. The reflecting array elements are generally formed parallel to each other, and the angle of the reflecting member or each of the reflecting array elements is generally approximately 45° to the X-axis or the Y-axis in order to propagate surface acoustic waves, such as Rayleigh-type waves, in the directions of the X-axis and the Y-axis. In accordance with the present invention, reflecting arrays 40 on back surface 15 have reflecting elements that are formed so as to direct the acoustic waves outwardly toward curved connecting surface 20 when such waves are sent from transmitting transducers, and to collect surface acoustic waves coming from curved connecting surface 20 toward receiving transducers. As known from U.S. Pat. No. 5,591,945, expressly incorporated herein by reference, the reflective array elements may also be inclined at other angles to produce non-rectangular wave paths for the touch screen or to effect a mode-conversion between the incident wave and the reflected wave, for example, quasi-Rayleigh to Love waves.

Reflective arrays may be formed in many ways, for example, printing, etching, stamping of a metal substrate, or shaping of the mold for a polymer substrate. The known reflective arrays are generally formed of a glass frit that is silk-screened onto a soda-lime glass sheet or other substrate material, formed by a float process, and cured in an oven to form a chevron pattern of raised glass interruptions. These interruptions typically have heights or depths on the order of 1% of the acoustic wavelength, and therefore only partially reflect the acoustic energy. In order to provide equalized acoustic power at the receiving transducer, the spacing of the reflective elements may be decreased with increasing distance from the transmitting transducer, or the balance of acoustic transmissivity and reflectivity of the reflective elements may be altered, allowing increased reflectivity with increasing distance from the transmitting transducer. Because the touch sensor is generally placed in front of a display device, and because the reflective array is generally optically visible, the reflective arrays have conventionally been placed at the periphery of the front surface of the substrate, outside of the nominal touch region, and have been hidden and protected under a bezel. However, with the present invention, reflective arrays 40 are formed on back surface 15 of substrate 5, and front surface 10 of substrate 5 does not need any protective bezel over its periphery.

Referring to FIGS. 2(*a*) and 2(*b*), one specific embodiment of the invention provides an Adler-type touch screen system which employs transducers 35 to couple piezoelectric elements to the sensing wave in the substrate. Touch sensor 1 thus provides a coordinate input device system comprising a substrate 5 having a laterally symmetrical display area on which surface acoustic waves can be propagated. Like a typical four transducer Adler-type system, two pairs of transducers 35 are provided respectively for the X and Y axes, but instead of being on front surface 10, transducers 35 are on back surface 15 of substrate 5. In particular, a transmitting transducer 35*a* is placed in a Y-axis transmitting area and a transmitting transducer 35*b* is placed in an X-axis transmitting area, where the transmitting areas are on back surface 15 of substrate 5. A receiving transducer 35*c*, placed in a Y-axis receiving area opposite the Y-axis transmitting area on back surface 15, is for detecting a Y-coordinate of a touch on front surface 10. A receiving transducer 35*d*, placed in an X-axis receiving area opposite the X-axis transmitting area on back surface 15, is for detecting an X-coordinate of the touch on front surface 10. That is, transmitting transducer 35*a* and receiving transducer 35*c* are used to detect touch positions of the Y-coordinate, and transmitting transducer 35*b* and receiving transducer 35*d* are used to detect touch positions of the X-coordinate. Each transducer 35 may either transmit or receive an acoustic wave, symmetrically. The two transducer pairs are disposed at right angles to define a coordinate system.

The touch sensor also includes a pair of Y-axis reflecting arrays 40*a* and 40*b* and a pair of X-axis reflecting arrays 40*c* and 40*d*, but instead of being on front surface 10, reflecting arrays 40 are on back surface 15 of substrate 5. Generally, surface acoustic waves travel from a transmitting transducer along an axis on which a reflecting array is provided near a peripheral edge of the panel. Optionally acoustic waveguide effects may be used to reduce the width of the reflecting array. The elements of the reflective array each couple part of the acoustic waves with a sensing wave traveling across the panel, and transmit part to an adjacent element in the array, thus coupling a dispersed sensing wave from the entire touch sensitive region to a narrow acoustic beam which couples to the transducer. In general, the system transmits a short-time ultrasonic wave signal in the form of a burst by transmitting acoustic wave transducers 35 and reflective arrays 40 dispersing the transmitted signals outwardly from back surface 15 around curved connecting surface 20, across front surface having nominal touch region 13, around the opposing curved connecting surface 20 inwardly to back surface 15, and through reflective arrays 40 to receiving acoustic wave transducers 35. Reflecting arrays 40a and 40c act as acoustic wave dispersers, and reflecting arrays 40b and 40d act as acoustic wave collectors. The system controller analyzes the received signal along the time base, to detect indicated coordinates of the touch (which occurs where the travel paths shown in FIG. 2(a) intersect) within nominal touch region 13 on front surface. The specific embodiment of FIGS. 2(a) and 2(b) provides an XY touch sensor using surface acoustic waves.

In particular, surface acoustic waves travel from transmitting transducer 35a along the negative (−) Y-axis direction on which reflecting array 40a is provided near a peripheral edge of back surface 15 of substrate 5. As seen by the solid line arrows indicating the sensing wave travel path in FIGS. 2(a) and 2(b), the elements of reflective array 40a each couple or reflect part of the acoustic waves with a sensing wave: traveling from reflective array 40a outwardly along the negative (−) X-axis direction toward and around the proximate connecting surface 20 of substrate 5, traveling along the positive (+) X-axis direction across front surface, traveling toward and around the opposing curved connecting surface 20 toward in a negative (−) X-axis direction reflective array 40b on back surface 15, and traveling along reflective array 40b in a positive (+) Y-axis direction to receiving transducer 35c. The elements of reflective arrays 40a and 40b also transmit part of the acoustic waves to an adjacent element of array 40a and 40b respectively. Similarly, surface acoustic waves travel from transmitting transducer 35b along the negative (−) X-axis direction on which reflecting array 40c is provided near a peripheral edge of back surface 15 of substrate 5. As seen by the solid line arrows indicating the sensing wave travel path in FIGS. 2(a) and 2(b), the elements of reflective array 40c each couple or reflect part of the acoustic waves with a sensing wave: traveling from reflective array 40c outwardly along the negative (−) Y-axis direction toward and around the proximate connecting surface 20 of substrate 5, traveling along the positive (+) Y-axis direction across front surface, traveling toward and around the opposing curved connecting surface 20 toward in a negative (−) Y-axis direction reflective array 40d on back surface 15, and traveling along reflective array 40d in a positive (+) X-axis direction to receiving transducer 35c.

The traveling of surface acoustic waves around curved connecting surface 20 is described in more detail in connection with FIG. 3(a), FIG. 3(b) and FIG. 3(c), which are cross-sectional partial views of differently curved edge connecting surfaces of the substrate of acoustic touch sensors, according to various specific embodiments of the invention. Incorporated by reference. U.S. Pat. No. 6,567,077 describes chamfered or rounded end or corner faces (acoustic wave direction changing portions) of a propagation medium substrate so that the acoustic wave can turn around and be propagated from the front surface to the rear surface of the propagation medium, or from the rear surface to the front surface of the propagation medium through the chamfered portion. As seen in FIGS. 1 and 2 of U.S. Pat. No. 6,567,077, an acoustic surface wave or the like traveling on the surface of a spherical propagation medium corresponds to the outline of a section made by cutting the sphere along a plane including the center of the sphere, and such a wave traveling on the surface of a columnar propagation medium travels spirally on the surface of the propagation medium. The acoustic wave thus is able to change directions by traveling across the curved surface of the propagation medium with negligible loss. FIGS. 3 and 4 of U.S. Pat. No. 6,567,077 illustrate rounded peripheral edge portions of the propagation medium that are chamfered to form a hemispherical-section having a radius R.

Figure 3A:
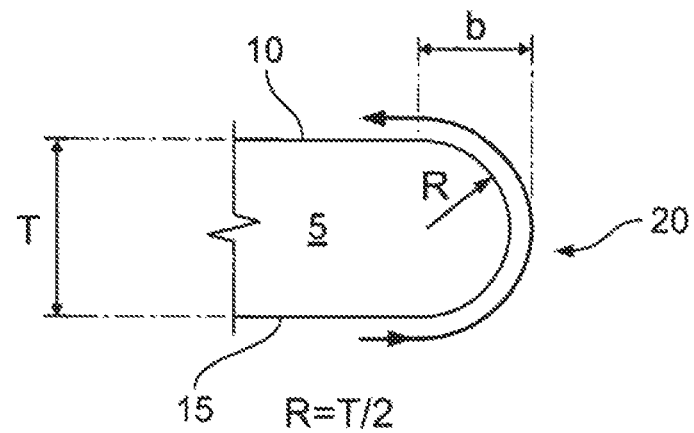
FIG. 3(a), FIG. 3(b) and FIG. 3(c) are cross-sectional partial views of differently curved connecting surfaces of the substrate of acoustic touch sensors, according to various specific embodiments.
Figure 3B:
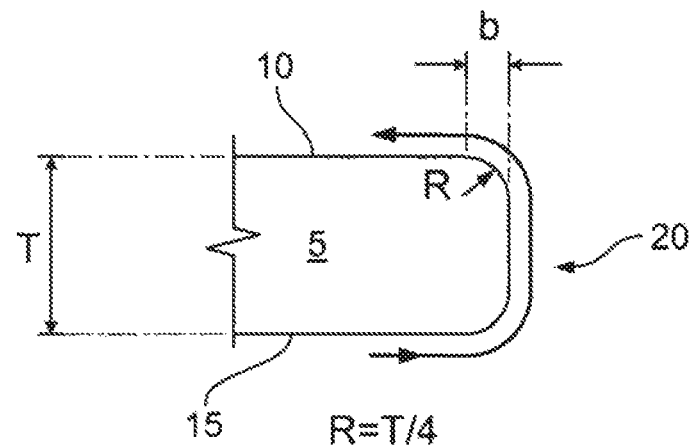
Figure 3C:
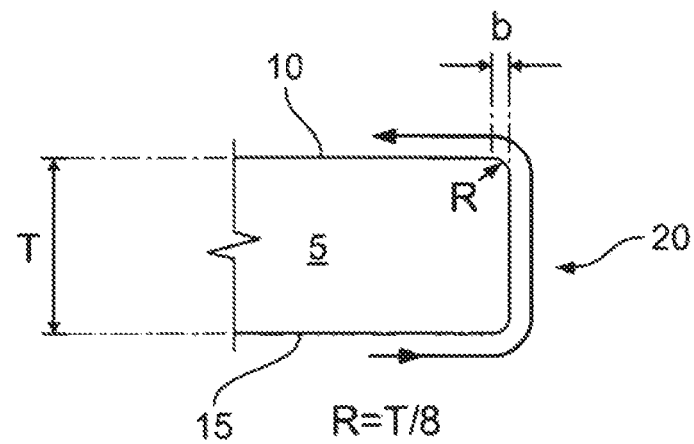
Figure 3D:
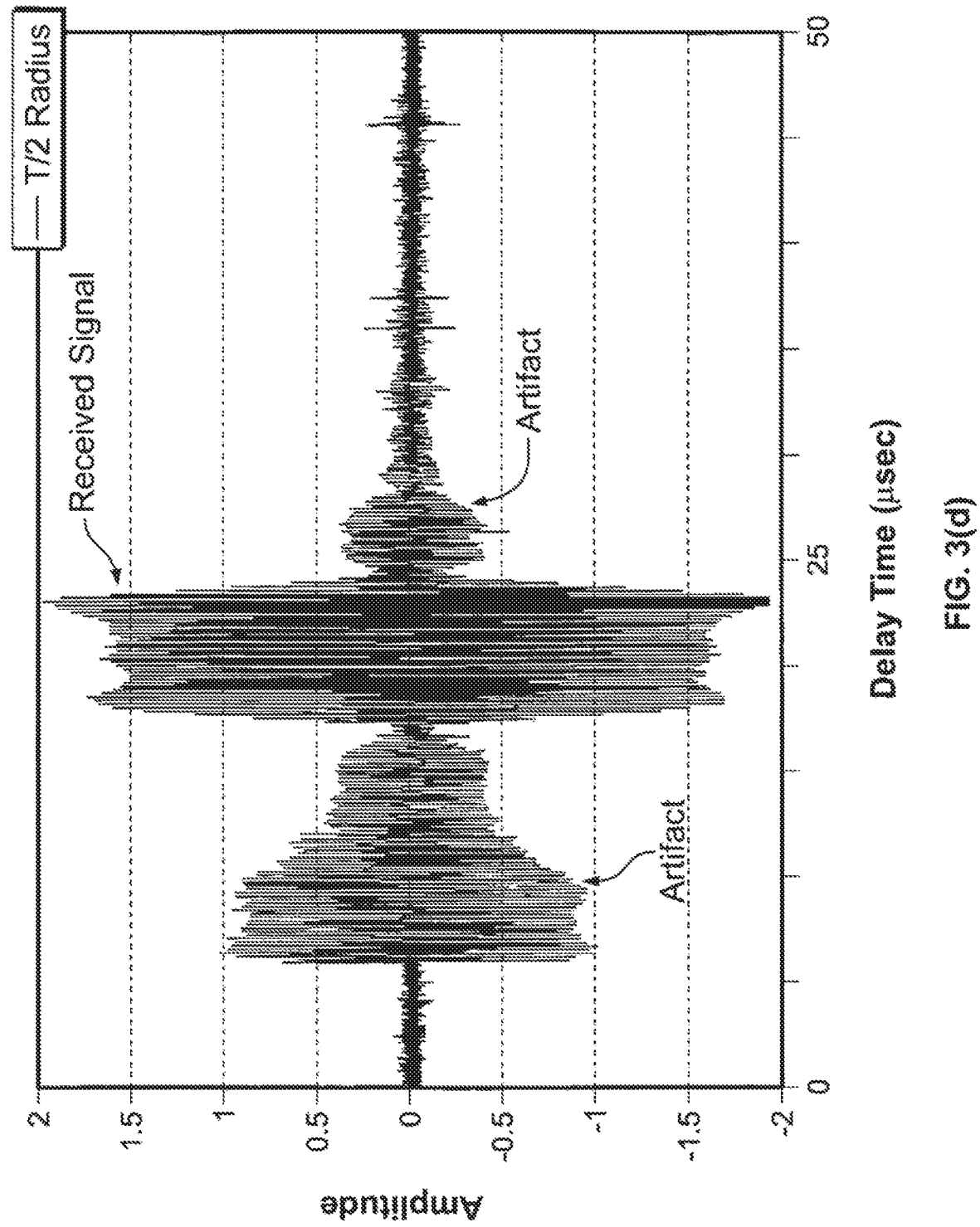
FIG. 3(d), FIG. 3(e) and FIG. 3(f), respectively, are experimental measurements illustrating the performance of surface acoustic waves traveling over the differently curved connecting surfaces of FIG. 3(a), FIG. 3(b) and FIG. 3(c)
Figure 4:
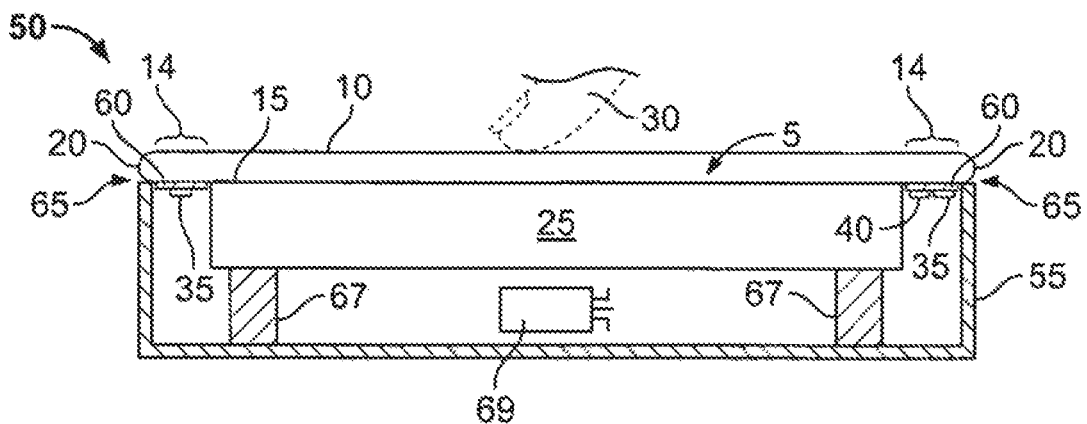
FIG. 4 is a simplified cross-sectional view of an acoustic touch device, according to another specific embodiment.
Figure 5:
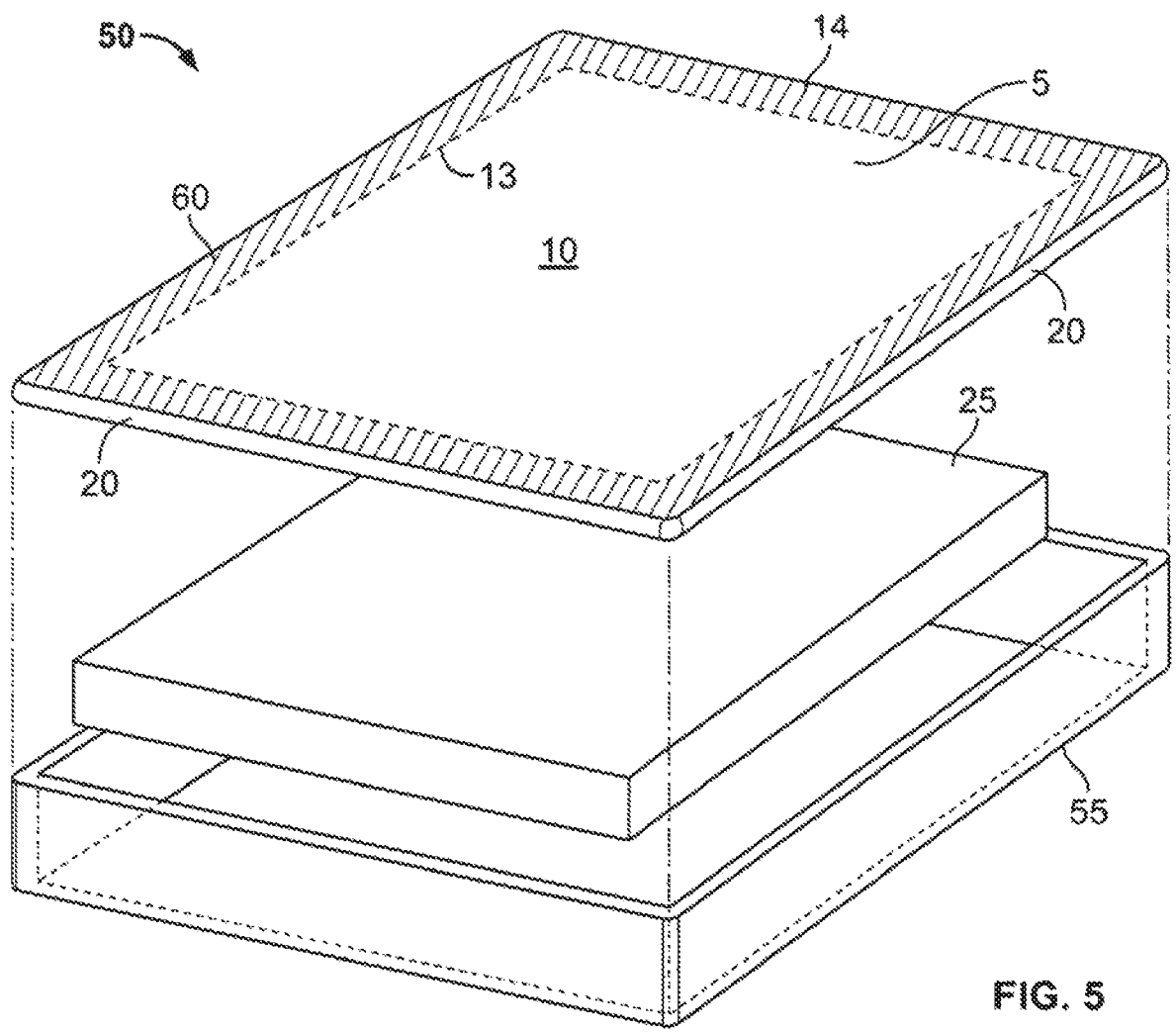
FIG. 5 is an exploded perspective view of an acoustic touch device according to a specific embodiment.

FIG. 3(a) illustrates a rounded portion 20 of propagation medium or substrate 5 having a radius R that is half the thickness T of substrate 5, similar to that hemispherical-section shown in FIG. 4 of U.S. Pat. No. 6,567,077. With a hemispherical-section having radius R, the length b of the rounded portion of propagation medium equals R, which equals T/2 when T is assumed to be five Rayleigh-wave wavelengths λ. However, the present inventors have determined that a hemispherical-section is not necessary to achieve the ability to change directions of the surface acoustic wave traveling across the curved surface of propagation medium without appreciable loss. As seen in FIG. 3(b), rounding the top and bottom sharp edges of substrate 5, such that the respective radius R of curved surface 20 is about T/4 results, in surface 20 of substrate 5 having a length b that is significantly less than the length b for a hemispherical-section. Moreover, as seen in FIG. 3(c), even modifying the top and bottom sharp edges of substrate 5 such that the respective radius R of curved surface 20 is about T/8 results in surface 20 of substrate 5 having a length b that is even smaller than that of FIGS. 3(a) and 3(b).

The present inventors have shown that as R (or b) increasingly approaches T/2 (or 5λ/2 for T=5λ), the curved surface 20 is somewhat better for surface acoustic wave transmission; but as R (or b) decreasingly approaches T/8 and remains much greater than the wavelength of the surface acoustic wave, the touch sensor's border region desirably becomes smaller. Accordingly, a tradeoff of these desires as well as consideration of cost factors is made, and for a specific preferred embodiment, R has been selected to be about T/4 to about T/8. It is recognized that radii R can be less than T/8 as long as there is a sufficient received signal and other design constraints are met. As aluminum is similar to glass as a substrate for surface acoustic wave propagation, experimental measurements were performed by the inventors on an aluminum substrate having curved connecting surface 20 with different radii of edge curvature and thickness (T) of about 3 mm. The experiment used acoustic wedge transducers having an approximately 3 mm wide ceramic piezoelectric element (in the family of PZT related piezoelectric ceramics, and having a fundamental resonance nominally at 5.53 MHz). The transmitting transducer was excited to transmit a surface acoustic wave that traveled across the substrate's front surface, toward and around the substrate's curved connecting surface having radius or radii R, and then traveled across the substrate's back surface for measurement by receiving transducer. For a given excitation voltage at frequency 5.53 MHz applied to the transmitting transducer, the amplitude of the signal measured over the relevant delay time for the received signal at the receiving transducer did not appreciably change for different radii, as seen in FIG. 3(e) (where the radii R=T/4) and FIG. 3(f) (where the radii R=T/8) compared to FIG. 3(d) (where the radius R=T/2). These measurements show the amplitudes of the received signals measured at the expected delay time (the expected received signal arriving with a delay time of between about 17 and about 25 microseconds) do not appreciably change for a given excitation. The other wave-forms on either side of the received signals are merely artifacts based on other unintended and extraneous wave or mode propagations in the substrate that occurred in the test system.

For curved connecting surface 20 of R having a range of about T/4 to about T/8, the inventors' experiments on aluminum propagation materials suggest that the smaller R is acceptable for surface acoustic wave transmission on glass propagation substrates but only if there are no "kinks" or sharply beveled edges. For glass vendors, a "rounded edge" glass substrate typically still has kinks. As described in connection with the formula shown in FIG. 9 of U.S. Pat. No. 5,739,479, bevel angle θ of 16 degrees between the bevel surface and the active touch surface for a monolithic soda lime glass substrate results in significantly less than a 6 dB signal loss over the acoustic path. A bevel angle θ of 25 degrees between the bevel surface and the active touch surface for a monolithic soda lime glass substrate showed about 8 dB measured signal loss over the acoustic path. Quadratic extrapolation from 25 degrees bevel data implies a 14 dB signal loss for a bevel angle θ of 33 degrees. In the specific embodiments, any kinks should have a bevel angle θ of less than about 10 degrees to have a loss of less than 3 dB with four kinks (two for each curved portion 20 on opposite sides of substrate 5) in a completed acoustic path.

The rounding of sharp bevel edges of a glass substrate can be achieved by grinding the glass to the desired profile and then optionally polishing to obtain the desired smooth profile for a specific embodiment. Kinks including for example a step 16 such as shown in FIG. 3(g) may be minimized or avoided, according to some embodiments. Such kinks or steps might result when a grinding tool 17 (whose cross section is shown) having the desired radius or radii R is used and the substrate 5 has an offset in alignment with the tool 17 and/or there are variations in the thickness of different substrates 5. Such kinks or sharply beveled edges on the edge of the touch substrate that may undesirably result in acoustic parasitic signals may be minimized or avoided, according to some embodiments. Parasitic signals (such as may result from conversions between surface acoustic waves and plate waves or other wave modes) undesirably may result in the touch sensor appearing to detect "ghost" touches, which are not actual touches, or measuring distorted coordinates, and such parasitics should be minimized, according to such specific embodiments. In FIG. 3(g), grinding tool 17 provided with, for example, R=T/3 is used with a conventional computer numerically controlled ("CNC") grinding machine. Step 16 results in undesired parasitic signals (from plate waves), even when the step (created by the offset or substrate thickness variation) is on the order of about the surface acoustic wave wavelength. In order to provide better tolerances for such variations in substrate thickness and/or an offset between the substrate and the grinding tool used, improved grinding tool 18 which has, for example, R=T/6 and a wider mouth with a taper angle α, ranging between about 10 to 12 degrees for some embodiments, and R=T/3 with a taper angle of about 3 to 5 degrees in other specific embodiment, may be used, as seen in FIG. 3(h). FIG. 3(h) shows the curved edge profile of substrate 5 manufactured using tool 18 when substrate 5 is not offset from, but in desired alignment with, the tool; FIG. 3(i) shows the curved edge profile of substrate 5 manufacturing using tool 18 having R=T/6 when substrate 5 is offset from the tool 18; and FIG. 3(j) shows the curved edge profile of substrate 5 manufactured using a grinding tool 17' (similar to tool 17 shown in FIG. 3(g) but with, for example, R=T/3, the tapered opening having angle α) when substrate 5 is offset from tool 17'. Although for a specific embodiment where the frequency is about 5.53 MHz, the use of a grinding tool having 4 degree taper angle and R=T/3 for a substrate thickness of about 3 mm was most desirable (but grinding tool with a 12 degree taper angle and R=T/6 for the same substrate thickness had undesirable parasitics), many factors affect both the strength and acceptable level of parasitic signals so that for some applications it may be acceptable to use a grinding tool of 12 degree taper angle and R=T/6. Depending on the alignment achieved or existing tolerances, the front and back surfaces 10 and 15 of substrate 5 are coupled via at least one curved connecting surface that may include flat portion(s), such as between the front surface 10 and a curved portion (the angle being less than 5 degrees between the flat portion and front surface 10 according to specific embodiments), between two respective curved sections, and/or between back surface 15 and a curved section (the angle being less than 5 degrees between the flat portion and front surface 10, according to specific embodiments). Of course, the examples shown could be similar to when the same substrate with a specified substrate thickness has some manufacturing thickness variation. The edges, as mentioned above, may be optionally polished for smoothness. Other methods of rounding the sharp edges of substrates may include plastic molding, glass molding or aluminum molding, according to other embodiments.

Figure 3E:
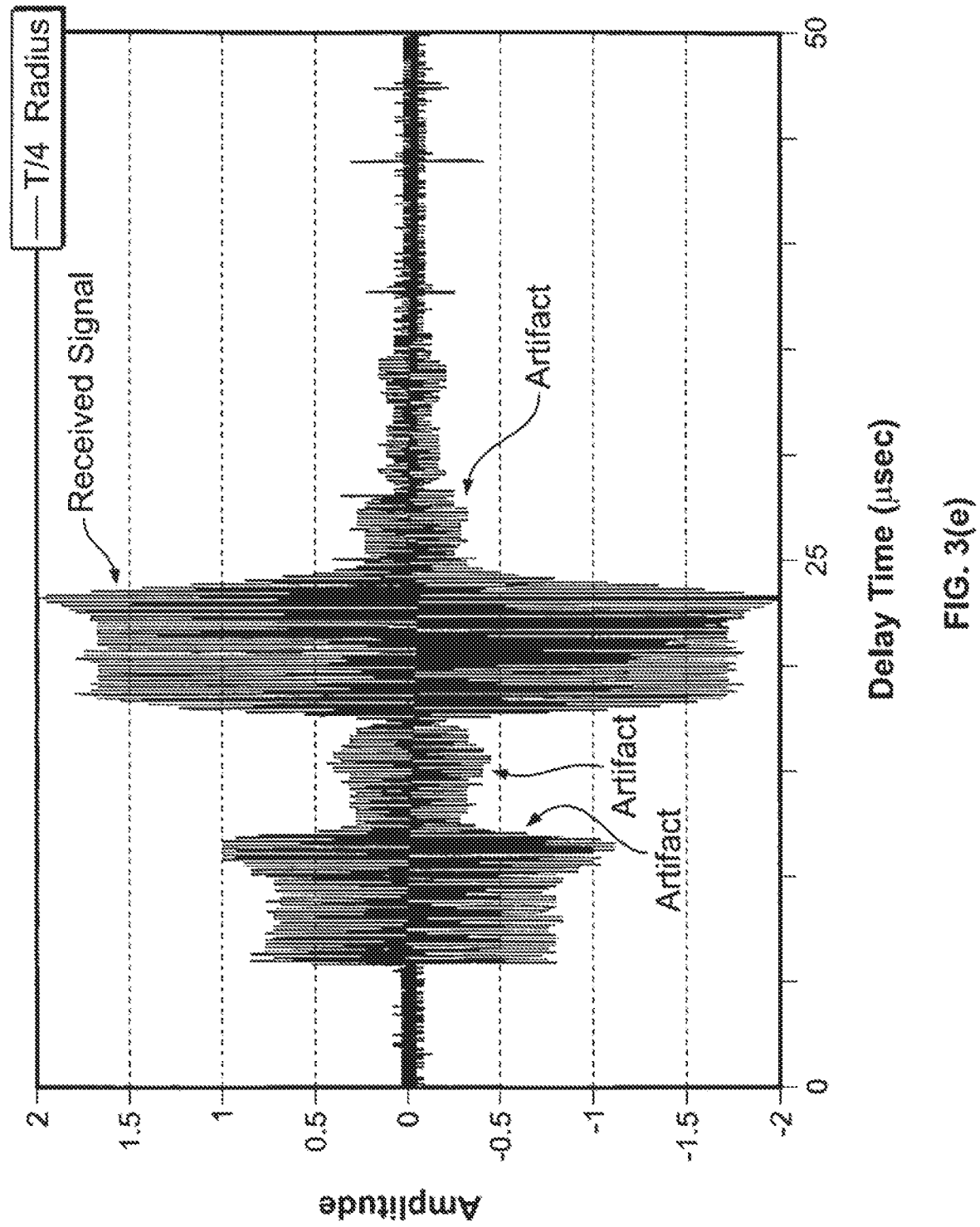
Figure 3F:
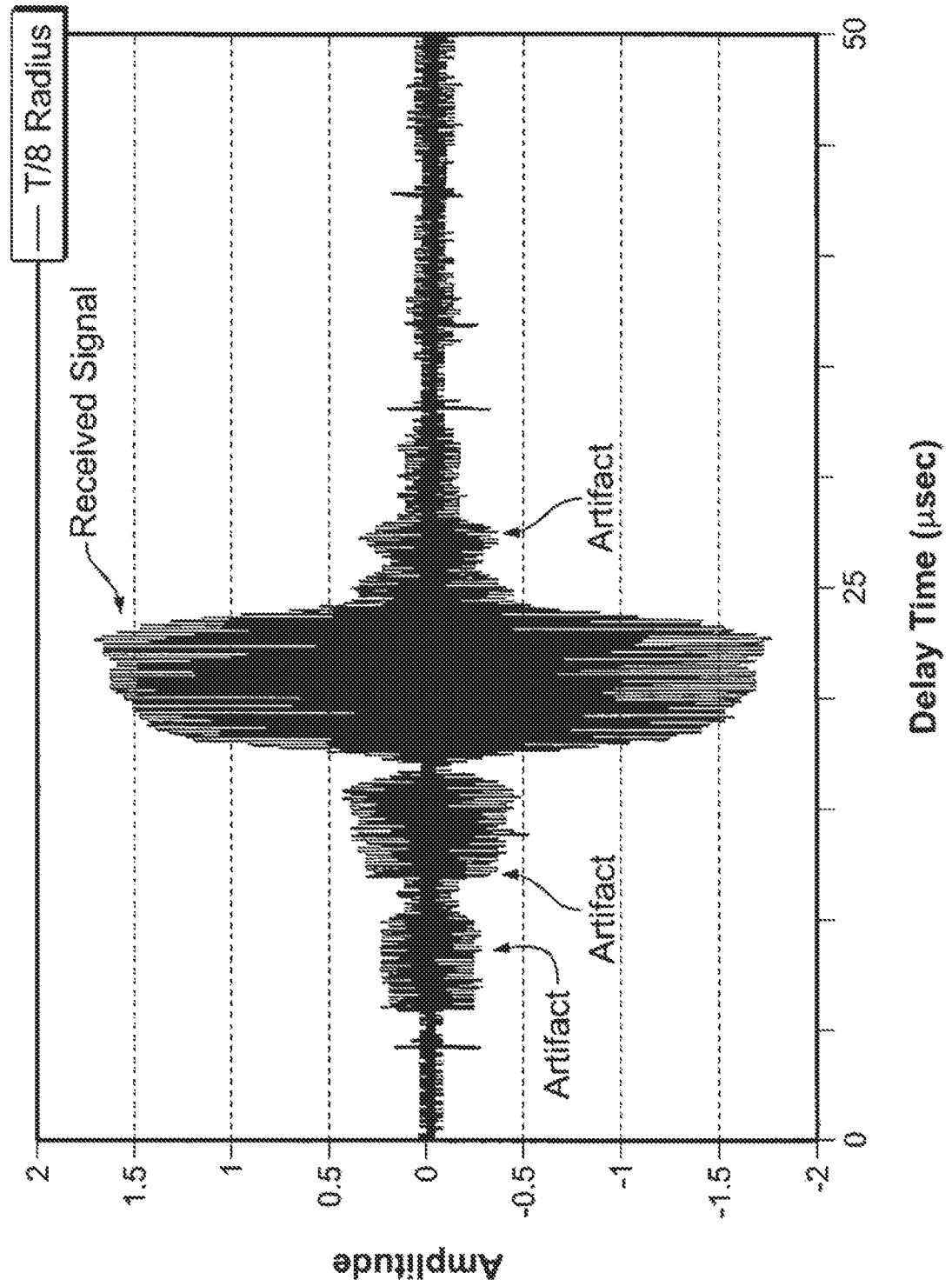
Figure 3G:
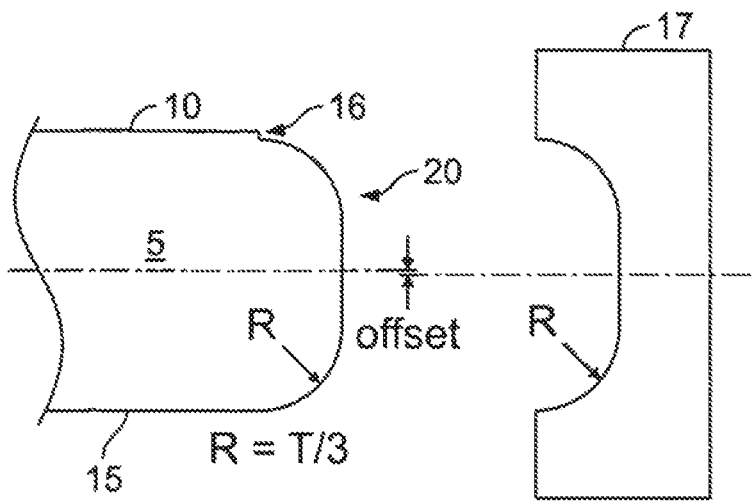
FIG. 3(g) is a cross-sectional partial view of an improperly processed edge of a substrate of an acoustic touch sensor manufactured with a grinding tool 17 that may be used in accordance with a specific embodiment of the invention.
Figure 3H:
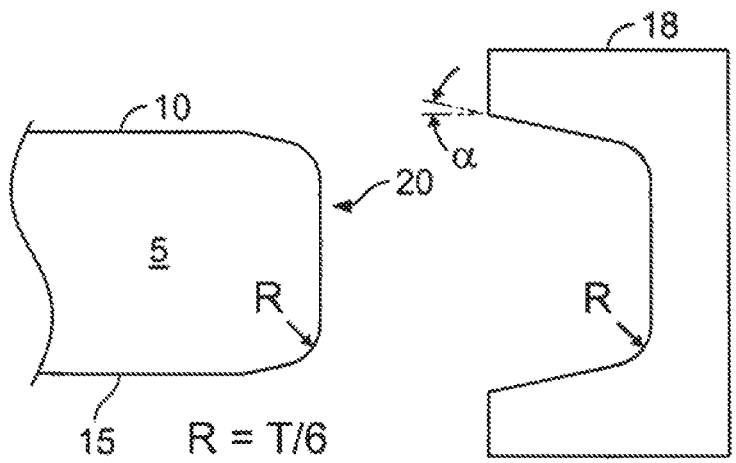
FIG. 3(h) is a cross-sectional partial view of a processed edge of a substrate of an acoustic touch sensor manufactured with a grinding tool 18 that may be used in accordance with another specific embodiment of the invention.
Figure 3I:
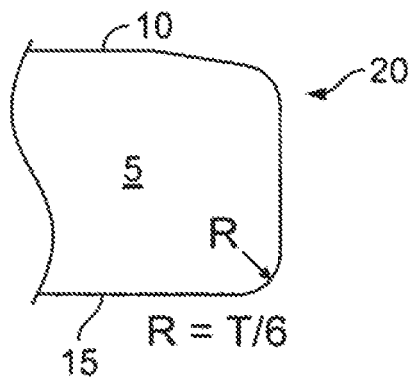
FIG. 3(i) and FIG. 3(j) are cross-sectional partial views of differently configured curved connecting surfaces of the substrate of acoustic touch sensors, according to further specific embodiments.
Figure 3J:
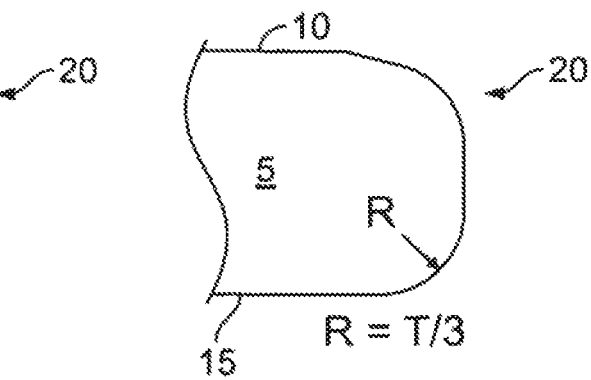

It should be recognized that curved connecting surface 20 may be of various cross-sectional profiles, such as shown in FIGS. 3(a)-3(c) or FIGS. 3(h)-3(j), and that curved connecting surface 20 includes at least one curved section of a radius R. FIGS. 3(b)-3(c) illustrate examples of curved connecting surface 20 having two symmetrically curved sections (each having the same radius R) coupled by a straight section, but with other embodiments of the invention curved connecting surface 20 may have two asymmetrically curved sections (having different values of R) coupled by a straight section. FIGS. 3(h)-(j) are cross-sectional partial views of differently configured curved connecting surfaces of the substrate of acoustic touch sensors, according to further specific embodiments, as discussed above. Of course, views in FIGS. 3(a)-3(c) and 3(h)-13(j) are not intended to be exhaustive but provide examples of the substrate curved edge profile. Furthermore, the radius R in FIGS. 3(g), 3(h), etc. can be generalized from the radius of an arc of a circle to the minimum radius of circles tangent to a curve of continuously changing curvature. Above it has been assumed that touch sensor substrate thickness T is about five Rayleigh-wave wavelengths λ as is often typical in most commercial product designs so that expressions such as R=T/3 can be re-expressed as R=5λ/3. Similarly, the expression R=T/6 can be re-expressed as R=5λ/6. Of course, the expressions would be modified for substrate thickness T that is different than five Rayleigh-wave wavelengths. For example, good parasitic suppression benefits have been observed for edge rounding radius of R=T/2 for 5.4λ thick glass. For, 5.4λ thick glass this edge rounding radius can also be expressed as R=2.7λ. While not required for acoustic reasons, there is market interest in SAW touchscreens built from much thicker (and tempered) glass substrates such as the SecureTouch™ products of Tyco Electronics with approximately 11λ thick glass; bezel-less variants of such products could be made with rounded edges of radius R=2.7λ for good parasitic wave suppression.

FIG. 4 is a simplified cross-sectional view of an acoustic touch sensor device 50 (also referred to as touch device 50), which may be a touch monitor, a touch computer, touch video display or signage, or touch mobile device, according to various specific embodiments of the invention. Similar to the touch sensor 1 of FIG. 1, touch device 50 includes substrate 5 with front surface, back surface 15, and curved surface 20 joining the peripheral region 14 of front surface and back surface 15. Front surface 10 has a nominal touch region 13, the inner portion of front surface, on which an object 30 makes contact to provide input according to the graphical user interface shown on a display 25 (shown in FIG. 4) coupled to back surface 15. According to a specific embodiment, display 25 may be optically bonded to back surface 15, but in other embodiments display 25 does not contact back surface 15 but is merely disposed under substrate 5 and held stable with respect to substrate 5 by housing 55 and an adhesive. FIG. 4 also illustrates electronics including touch controller (as described in detail below) as box 69 with leads connecting to wires and/or cables (not shown). Nominal touch region 13 is defined as the portion of front surface 10 within dotted lines in FIG. 2(a), and peripheral region 14 is the portion of front surface 10 external to nominal touch region 13. Object 30 is seen in FIG. 4 as a finger, but it is recognized that touches sensed by the acoustic waves may include a stylus pressing against front surface directly or indirectly through a cover sheet (provided the cover sheet covered those surfaces of substrate 5 that are used for acoustic sensing wave travel paths) or an anti-reflective coating, according to some specific embodiments.

The general structure and operation of the touch aspects of the invention, according to a specific embodiment, are similar to those described above in connection with FIGS. 1, 2(a) and 2(b), with some differences that are now described.

Acoustic transducers 35 and reflective element arrays 40 are coupled via an acoustically benign layer 60 to back surface 15, according to this specific embodiment. For purposes of this description, an "acoustically benign" material is one that propagates surface acoustic waves without rapid attenuation, preferably resulting in only small changes to the surface acoustic wave's velocity for easier manufacturing control of the wave's velocity despite factional changes in material thickness. According to some specific embodiments, acoustically benign layer 60 is preferably opaque and is able to both bond with substrate 5 and serve as an adequate processing surface for transducers 35 and reflective arrays 40 formed thereon. For example, wedge transducers 35 are bonded on, and reflective arrays 40 are formed with frits on, layer 60. In some embodiments, layer 60 may be a thin film of black inorganic material (such as an ink or a paint that is screen printed, painted or sputtered or otherwise applied) on back surface 15 of substrate 5.

According to a specific embodiment, acoustically benign layer 60 may be an inorganic black paint made of ceramic resin or porcelain enamel types of material. Examples of layer 60 may include titanium dioxide ($TiO_2$) or silica ($SiO_2$) that can be combined in some embodiments with cobalt (Co), chromium (Cr), copper (Cu), nickel (Ni) or manganese (Mn) for rich colors. Certain high heat resistant paint formulas, such as RustOleum™ high heat ultrapaint or Ferro™ glass coating 1597 may be suitable for use as acoustically benign layer 60. In other embodiments, layer 60 may be white or other colors, Layer 60 can provide an appealing or vibrant visual appearance, while hiding transducers 35 and arrays 40 from view through substrate 5. Layer 60 may also have a composite of colors used in patterns, other decorative features, and/or useful features such as to indicate edge sensitive touch function inputs according to specific embodiments of the invention. In some embodiments, acoustically benign layer 60 may be translucent, so that light sources (such as light emitting diodes) may be disposed behind back surface 15 to shine through translucent layer 60 when activated. Of course in some embodiments, concealing transducers 35 and arrays 40 may not be desired if a more industrial or technical appearance is sought, in which case layer 60 may be transparent, not used at all (such as shown in FIG. 1), or only used on a portion of peripheral region 14 of back surface 15.

When disposed between back surface 15 and transducers 35 and arrays 40, layer 60 is thus visible through substrate 5 (and with embodiments where layer 60 is opaque, shielding from view transducers 35 and arrays 40) and so appears to users to frame nominal touch region 13 (which is shown within dotted lines in FIG. 5, which is a simplified exploded perspective view of acoustic touch sensor 50), according to a specific embodiment of the invention. According to a specific embodiment, touch sensor 50 is a rectangular shaped touch device that integrates display 25, which faces back surface 15, such that the display is visible through substrate 5. In some embodiments, a thin layer 60 could even be applied to peripheral portion 14 of front surface 10 of substrate 5.

Figure 13:
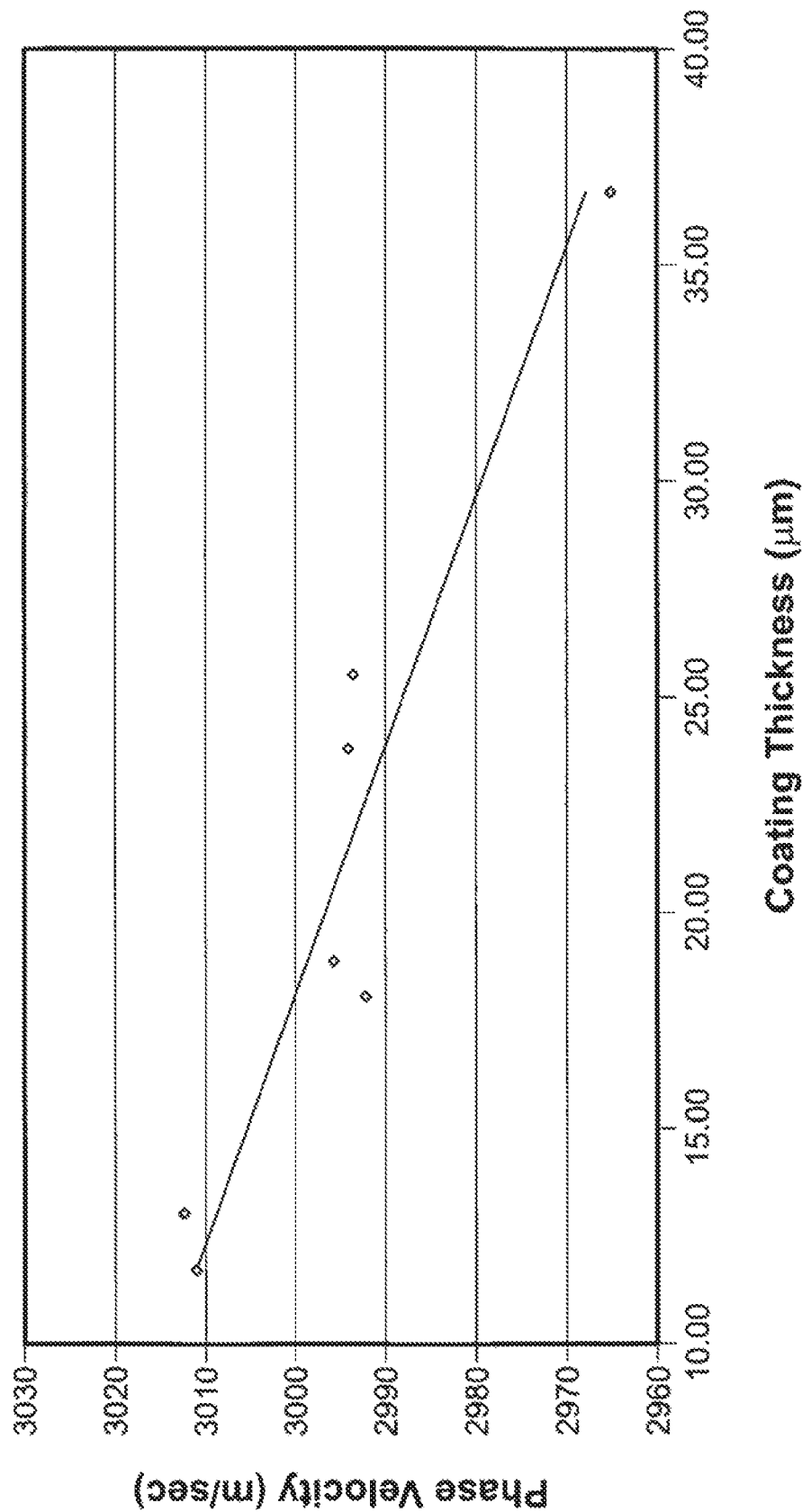
FIG. 13 is a graph plotting wave velocity of the acoustic touch sensor as a function of the thickness of the acoustically benign layer according to a specific embodiment.

The thickness of layer 60 should be controlled so that the signal attenuation resulting from layer 60 is balanced with any cosmetic objectives relating to its opacity. As seen in FIG. 13, the wave velocity (or more precisely the phase velocity of wave fronts in contrast to the group velocity of wave packets) of surface acoustic waves propagating in the region of layer 60 for a touch sensor is affected by the coating thickness of layer 60. For many materials that can be sintered at temperatures compatible with glass substrates, the speed of sound is slower than for glass. In this case, the wave velocity $v_{SAW}$ is reduced as the portion of the surface acoustic wave power propagating through the layer 60 increases (i.e., the thickness of layer 60 results in slower wave propagation). If the material of layer 60 has a faster speed of propagation of sound than the material of substrate 5, then the wave velocity $v_{SAW}$ is increased as the portion of the surface acoustic wave power propagating through the layer 60 increases (i.e., the thickness of layer 60 results in faster wave propagation). From the perspective of manufacturing process control of the wave velocity $v_{SAW}$, the ideal material for layer 60 would result in no change in wave velocity and hence no variation in wave velocity with the thickness of layer 60. For the layer 60 material used to generate the data for FIG. 13, it was also observed that very strong attenuation occurs when the layer 60 thickness is over 50 microns for these frequencies. For a specific embodiment where the frequency is about 5.53 MHz and the substrate is a B270 glass, a thickness of layer 60 ranging between about 15-21 microns, or preferably 12-20 microns, was found to be an acceptable thickness that balanced the desire for low wave attenuation and clean cosmetic appearances (high opacity without perceived translucence) when using Ferro black ink 24-8328 for layer 60. Other ink products may exist that have higher optical densities enabling a clean cosmetic appearance with thinner coatings, which could be desirable for acoustic design reasons as it may reduce acoustic attenuation and reduce variations in wave velocity.

Touch device 50 includes a housing 55 which contains and protects display 25, layer 60, transducers 35, reflective element arrays 40, as well as other components of the device, such as processors, controllers, connectors, and other passive or active electronics or parts that may be needed for operation of the device. For simplicity, these other components are not shown.

The touch sensor systems or devices according to the present invention typically employ an electronic control system (not shown in the drawings), which generates the acoustic waves and determines perturbations indicative of a touch position or coordinate. The electronic control, in turn, interfaces with a computer system (not shown in the drawings), for example a personal computer, embedded system, kiosk or user terminal as a human interface device. The computer system may therefore be of any suitable type, and for example may include display 25, audio input and/or output capability, keyboard, electronic camera, other pointing input device, or the like. The computer system operates using custom software, but more typically using a standard operating system such as Microsoft Windows (e.g., 3.1, 3.11, 7, WFW, CE, NT, 95, 98, etc., or other operating system which conforms to a set, subset or superset of Windows Application Program Interfaces or APIs), Macintosh operating system, UNIX variants, or the like. The touch sensor may thus be employed as a primary or secondary pointing device for a graphic user interface system to receive user input. The touch sensor controller and computer system may also be integrated, for example in an embedded system.

According to the specific embodiment, housing 55 is coupled to substrate 5 and may be environmentally sealed at the periphery 65 by some suitable means such as a strip of closed cell foam, a soft rubber gasket with a wiper blade cross section, and narrow adhesive bond of RTV silicone or an epoxy, or other material and contact width that is acoustically benign. Thus, the seal at periphery 65 is provided to allow sufficient acoustic wave energy to permit touch sensor operation, while protecting arrays 40 and transducer 35, as well as display 25 and other components/wires/parts within housing 55 from contamination. In some embodiments, in addition to the seal at periphery 65, substrate 5 may have posts (not shown) connected at certain locations, such as near its corners on back surface 15, to attach to housing 55. In some other embodiments, such as described below for FIGS. 6(a) and 6(b) and 6(c), substrate 5 may be joined and/or bonded to housing 55 via other hardware such as a sub-bezel.

According to a specific embodiment, substrate 5 may be a sheet of about 3 mm thick annealed glass, a heat tempered or chemically strengthened glass. The nominal touch region 13 is located within front surface 10 of substrate 5. There is no interruption of the flat front substrate surface 10, according to the specific embodiment, and no bezel thereon is used or desired. In particular, it is noted that there are no reflective arrays or transducer components on front surface 10 of substrate 5.

Behind the nominal touch region 13 of substrate 5, display 25 is optically bonded in a bonding region with a suitable bonding material to back surface 15 of substrate 5, according to a specific embodiment. The optical bonding material is an acoustically absorbing, optically transparent bonding material such as 3M™ Optical Clear Adhesive 8171. Optical bonding material is a solid material in intimate mechanical contact with substrate 5 and therefore acoustically absorbs any unintended plate wave and/or surface acoustic wave paths on back surface 15 that would otherwise propagate between opposing pairs of reflective arrays 40. Display 25 may be, for example, a liquid crystal display (LCD), organic light emitting device (OLED) display, electrophoretic display (EPD), vacuum fluorescent, cathode ray tube, or other display. Alternately, display 25 may be a reverse projection screen that is optically bonded to substrate 5. In some embodiments, display 25 is optionally coupled to mechanical supports 67 for attachment to housing 55. In other embodiments, display 25 may not be optically bonded to substrate 5, but instead uses mechanical supports 67. In still further embodiments, such as described below for FIGS. 6(a)-6(c), display 25 may be joined and/or bonded to housing 55 via other hardware such as a sub-bezel or such as described for FIGS. 6(d)-6(h). For embodiments where optical bonding material is not used, it may still be desirable to apply an optically transparent and acoustically absorbing material, such as by adhering an anti-spall material or by applying a thin transparent polymer layer by screen printing, behind the nominal touch region 13 on the back surface 15 of substrate 5 so that parasitic signals caused by unintended plate wave or surface acoustic wave paths between opposing pairs of reflective arrays 40 are minimized or avoided.

On back surface 15 of substrate 5, four reflective element arrays 40 and four Rayleigh-wave wedge transducers 35 are provided in an arrangement similar to, e.g., the system shown in FIGS. 2(a) and 2(b). Note that any unintended acoustic paths on back surface 15 between the reflective array 40 pairs are blocked by the acoustically absorbing optical bonding material of display 25, in embodiments where display 25 is optically bonded to substrate back surface 15.

Figure 6A:
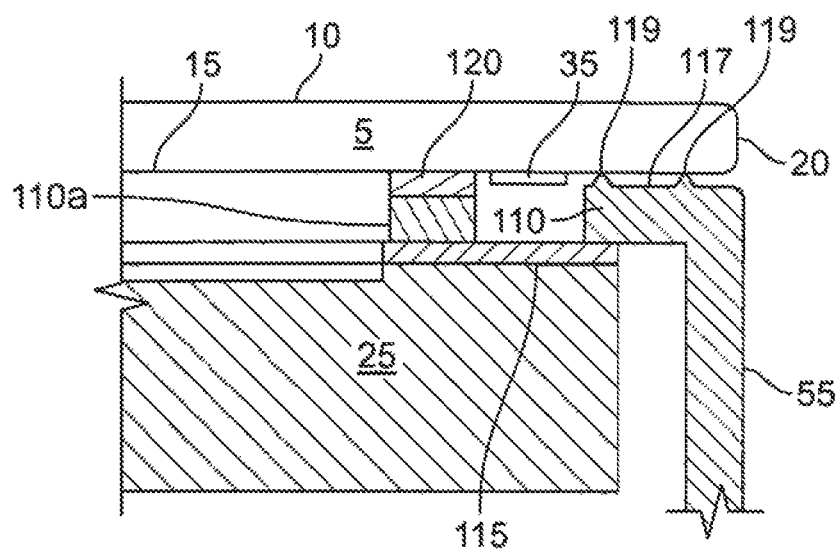
FIG. 6(a) and FIG. 6(b), respectively, are a partial cross-sectional view and a partial plan view of a corner configuration and mounting scheme for a bezel-less acoustic touch device, according to a specific embodiment.
Figure 6B:
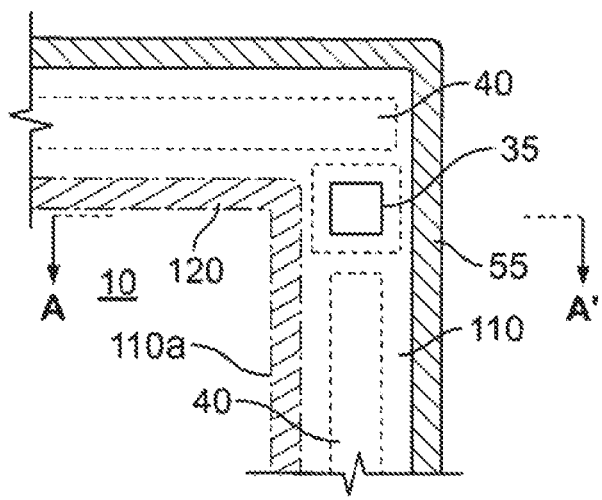

According to a specific embodiment, FIG. 6(a) illustrates a cross-sectional partial view of a corner configuration and mounting scheme for a bezel-less acoustic touch sensor device, and FIG. 6(b) is a partial plan view of a corner configuration and mounting scheme for bezel-less acoustic touch sensor device, according to a specific embodiment of the invention. As seen in FIGS. 6(a) and 6(b), housing 55 including a sub-bezel or flange 110 disposed beneath substrate 5 encloses the various components of touch sensor device 50. From the unmagnified perspective of a user of the device, the entire top surface 117 of the outer portion of flange 110 may appear to be contacting back surface 15 of substrate 5. However, top surface 117 of the outer portion of flange 110 actually is separated from surface 15 has an air gap therebetween, except for certain locations where protrusions 119 are formed on surface 117 of flange 110. Protrusions 119 act as spacers between back surface 15 of substrate 5 and flange 110. According to a specific embodiment, protrusions are on the order of 10 microns high and make limited physical contact with back surface 15 of substrate 5 only at certain locations, and those contact areas are not sufficient to result in any appreciable surface acoustic wave absorption that might otherwise be caused if surface 117 of flange 110 was actually in contact with back surface 15. In some embodiments, the air gap between surface 15 and top surface 117 may have disposed therein an acoustically benign perimeter sealant such as a strip of closed cell foam or rubber gasket with a wiper blade cross section in order to prevent contaminants or liquids from entering housing 55 and potentially damaging display 25 or the electronic components therein.

Providing a cross-sectional view taken across line A-A' shown in FIG. 6(b), FIG. 6(a) illustrates a peripheral display bonding layer 115 that secures display 25 to flange 110 of housing 55, and a peripheral substrate bonding layer 120 that secures touch substrate 5 to flange 110 of housing 55. Flange 110 of housing 55 has a cut-out to accommodate the dimensions of transducer 35, which is coupled to back surface 15 either via acoustically benign layer 60 (not shown) or directly, according to specific embodiments. Peripheral display bonding layer 115 may be a double-sided adhesive tape, an epoxy, or any other means to provide a reliable mechanical bond, and peripheral substrate bonding layer 120 may be an epoxy, double-sided adhesive tape, or any other means to provide a reliable mechanical bond. It is desirable that the material of bonding layer 120 is acoustically absorptive and as typically the case for mechanically or structurally reliable adhesive. In a specific embodiment, four millimeter wide double-sided adhesive tape may be sufficient to be used as bonding layers 115 and/or 120. Two reflective arrays 40 are shown in dotted line in FIG. 6(b) to illustrate their placement with respect to transducer 35, according to a specific embodiment. With this mounting configuration, arrays 40 do not make contact with flange 110 due to protrusions 119. Note that any unintended acoustic paths that would otherwise travel on back surface 15 between opposing pairs of reflective arrays 40 are blocked by the peripheral substrate bonding layer 120 in this embodiment.

Figure 6C:
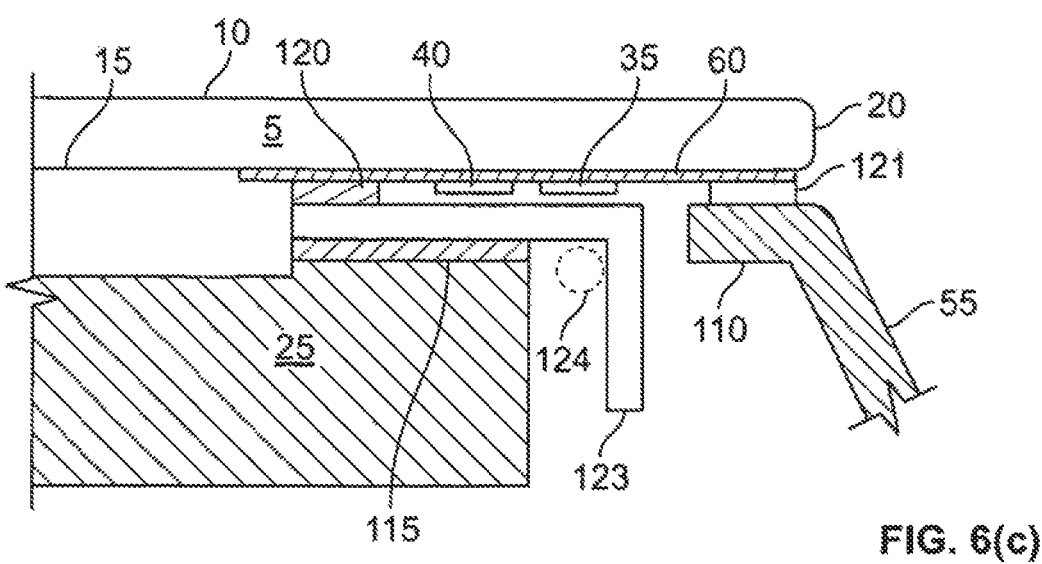
FIG. 6(c) illustrates a cross-sectional partial view of another corner configuration and mounting scheme for a bezel-less acoustic touch sensor, according to another specific embodiment.

FIG. 6(c) illustrates a cross-sectional partial view of another corner configuration and mounting scheme for a bezel-less acoustic touch sensor, according to another specific embodiment. FIG. 6(c) does not show a cross-section along line A-A' of FIG. 6(b), but shows a cross-section in a similar area in accordance with this specific embodiment where transducer 35 is disposed behind substrate 5 in a corner location higher than shown in the embodiment of FIG. 6(b). Similar to the embodiment shown in FIG. 6(a), housing 55 including a sub-bezel or flange 110 disposed beneath substrate 5 encloses the various components of touch sensor device 50. In this embodiment, acoustically benign layer 60 is shown disposed between back surface 15 of substrate 5 and transducer 35 and reflective array 40. An acoustically benign perimeter sealant 121 is disposed between layer 60 and flange 110 to provide a barrier for contaminants or liquids from entering housing 55 and potentially damaging display 25 or the electronic components therein. For a specific embodiment, sealant 121 may be a strip of closed cell foam (such as Volara™ foam) or rubber gasket with a wiper blade cross section. Display 25 has a bracket 123 disposed thereon via bonding layer 115 described above. Bracket 123 is coupled to substrate 5 via acoustically benign layer 60 by bonding layer 120. Bracket 123, which optionally may be coupled to housing 55 to provide additional secure mounting of substrate 5, serves to physically (and/or electrically and/or acoustically) isolate any cable(s) or wire(s) 124 (indicated by dotted line circle) for the touch sensor and/or display 25 from reflective arrays 40. Bracket 123 may be a frame-like structure, constructed of a metal material, having cut-outs (not shown) so that, for example, a wedge transducer 35 and its associated wiring may be provided through the cut-out and tucked under bracket 123. In this embodiment, bracket 123 may be in contact with reflective arrays 40, but the metal material has a surface that does not make sufficient contact to acoustically attenuate or otherwise interfere with the traveling surface acoustic waves. This mounting configuration including bracket 123 enables satisfactory bonding to display 25 having a narrow perimeter border and the necessary isolation of cables and/or wiring 124 to integrate substrate 5, transducers 35, arrays 40 and display 25 within housing 55.

Figure 6D:
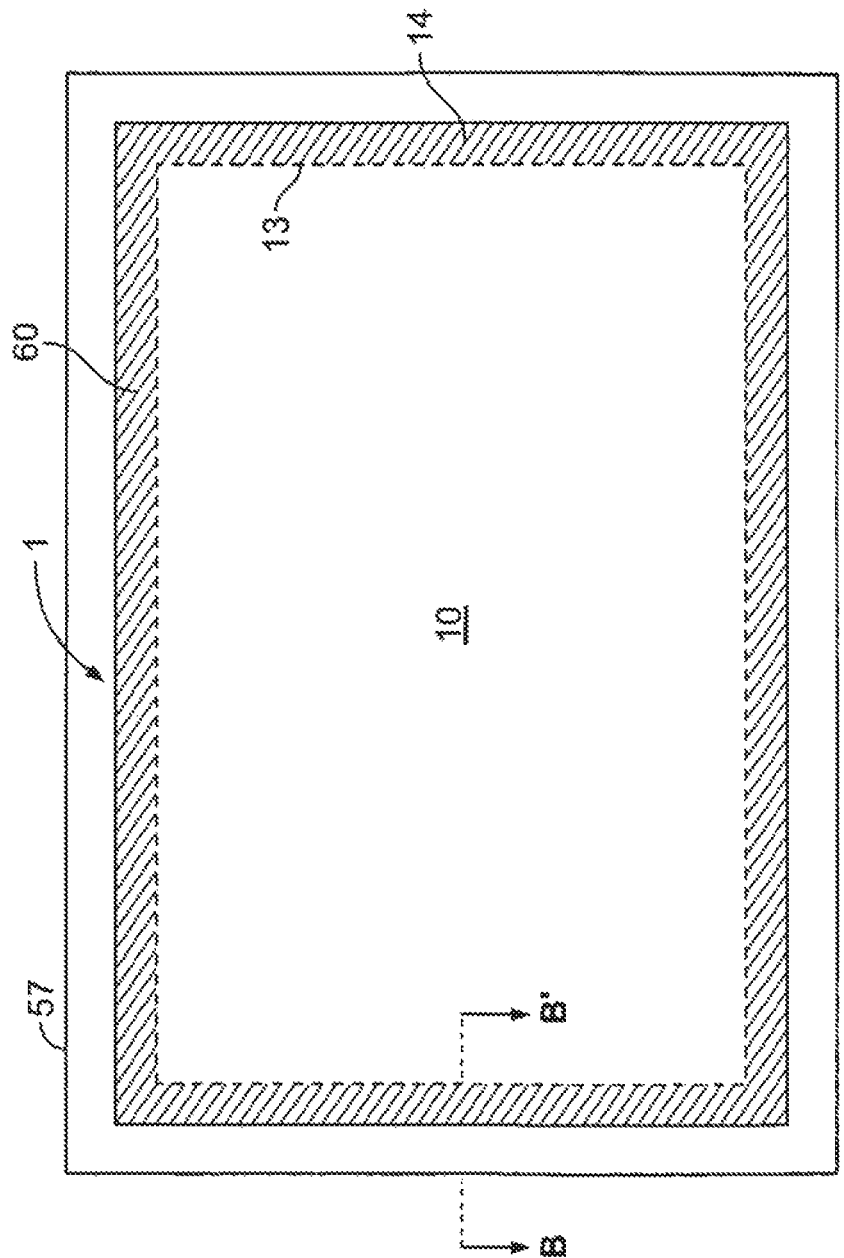
FIG. 6(d) is a front view of a bezel-less acoustic touch sensor provided as part of another system such as a kiosk system, according to specific embodiments.

FIG. 6(d) is a front view of a bezel-less acoustic touch sensor provided as part of another system such as a kiosk system, according to some specific embodiments. For example, the bezel-less acoustic touch sensor 1 may be desired to be part of a larger system, such as for kiosk that has a frame 57 surrounding the acoustic touch sensor. Of course, if the sensor 1 is rear mounted as part of a countertop, frame 57 could extend beyond the perimeter shown in FIG. 6(d). FIGS. 6(e)-6(h) show cross-sectional perspective slices looking into arrows B-B' shown in FIG. 6(d), and the reflective arrays and transducers of sensor 1 are not shown in these views.

Figure 6E:
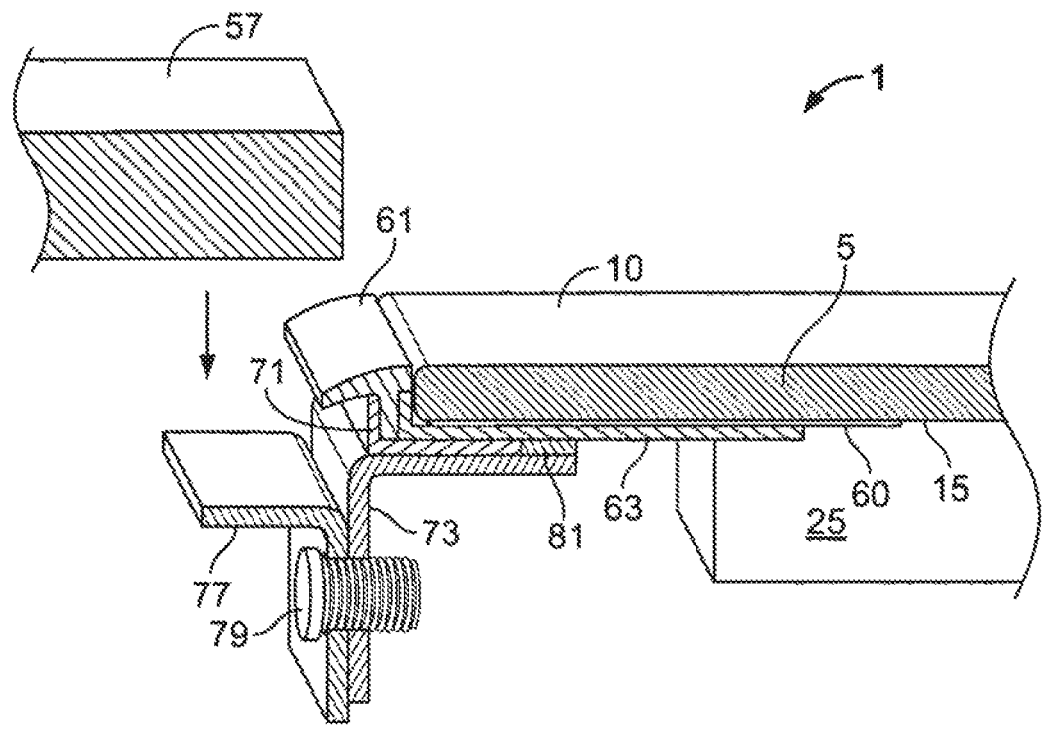
FIG. 6(e) illustrates a partial cross-sectional slice perspective views of a sealing scheme for a bezel-less acoustic touch sensor shown just prior to flush mounting as part of another system such as a kiosk system, according to a specific embodiment.
Figure 6F:
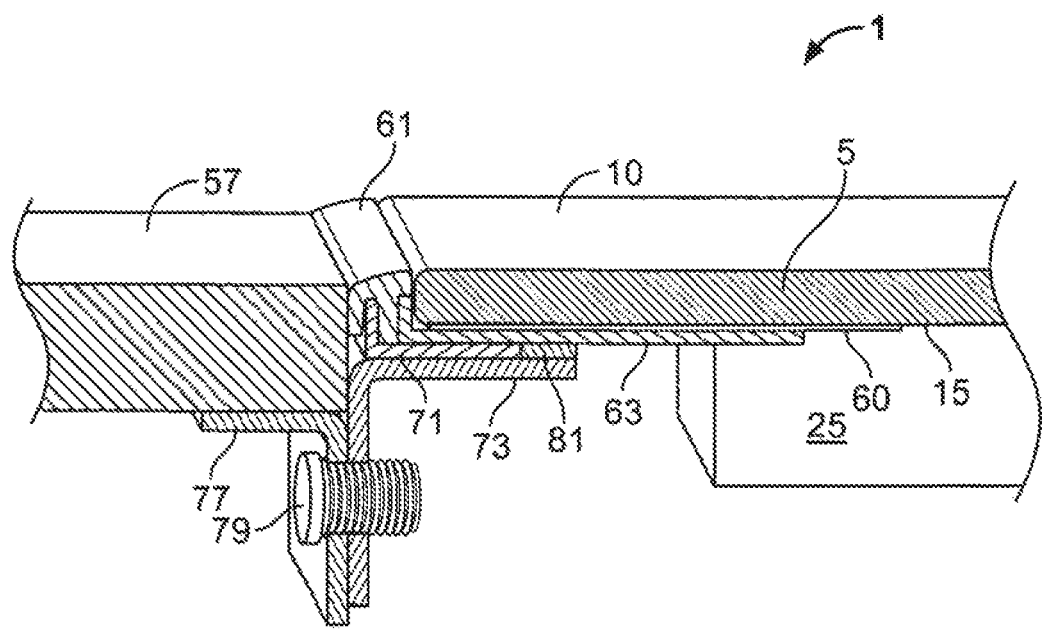
FIG. 6(f) illustrates a partial cross-sectional slice perspective views of a mounting scheme for a bezel-less acoustic touch sensor shown mounted as part of another system such as a kiosk system, according to the embodiment of FIG. 6(e)

FIG. 6(e) illustrates a partial cross-sectional slice perspective view of a sealing scheme for a bezel-less acoustic touch sensor shown just prior to flush mounting as part of a larger system such as a kiosk system, according to a specific embodiment. FIG. 6(f) illustrates a partial cross-sectional slice perspective views of a mounting scheme for a bezel-less acoustic touch sensor shown mounted as part of another system such as a kiosk system, according to the embodiment of FIG. 6(f). To provide context for the sealing scheme of touch sensor 1 with frame 57 of the larger system, FIGS. 6(e)-6(f) show a portion of touch substrate 5 having front surface 10 and back surface 15 having acoustically benign layer 60 coated thereon in the peripheral region 14, with display 25 coupled to back surface 15 such that the images on the display are visible through substrate 5 in the region 13. Made of elastomer material or other acoustically benign material, a gasket 61 surrounds, and is in contact with, the curved connecting surface 20 along the periphery of substrate 5. Gasket 61 may be an extruded, determinable silicon or stiff rubber, according to specific embodiments. Prior to mounting, gasket 61 has a wiper blade shaped cross-sectional profile, with a protruding head that is in contact with the top half of the curved connecting surface 20 of substrate 5 and then extends outward in a blade or flange, and with a downward stem portion. As seen in FIGS. 6(e) and 6(f), a bracket 63 is disposed between the right side of the stem portion of gasket 61 and a bottom half portion of the curved connecting surface 20 at peripheral portion of the layer 60-coated bottom surface 15 of substrate 5. Formed as a frame around the periphery of substrate 5, bracket 63 may be made of metal or plastic and is used to control the compression of gasket 61 against substrate 5. Bracket 63 has double sided adhesive (not shown) applied to fasten to the back surface 15 of substrate 5. This adhesive is interior (toward the display 25) to the transducers and reflective arrays on back surface 15. A bracket 71 made of spring steel or other spring metal material, also referred to as a spring bracket, is disposed between the left side and bottom of the stem portion of gasket 61 and at least part of bracket 63. Bracket 71 positions gasket 61 against the substrate 5 so that constant, even pressure is applied. In combination, gasket 61, bracket 71 and bracket 63 provide a consistent yet minimal contact to substrate 5, with an even pressure to provide good sealing from moisture and the environment while minimizing the contact area of gasket with substrate 5 to avoid excessive acoustic attenuation of the acoustic waves propagating around curved connecting surfaces 20. Bracket 73 is attached at least to frame bracket 63 via double sided adhesive 81. Although only partially shown in the figures, it should be recognized that adhesive 81 may also be disposed between the bottom surface of spring bracket 71 and bracket 73. Bracket 77, which is conventionally connected to frame 57 and is height adjustable via a slot through which a conventional fastener 79, such as a screw with nut (not shown), is disposed to connect with bracket 73 which has a hole or slot that overlaps with that of bracket 77. Each of bracket 73 and 77 may be formed as a frame generally proportional with the periphery of sensor 1 and/or multiple of these brackets may be used in various locations along the periphery. Bracket 73 and 77 may be made of metal.

Figure 6G:
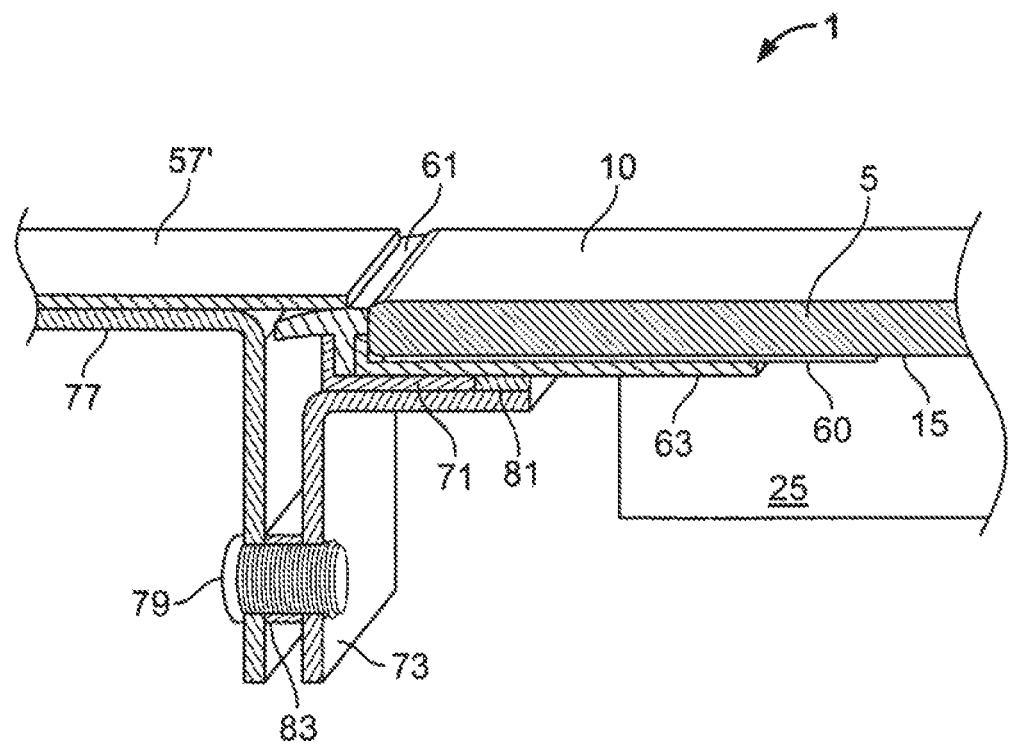
FIG. 6(g) and FIG. 6(h) illustrate partial cross-sectional slice perspective views of two other mounting schemes for a bezel-less acoustic touch device shown mounted as part of another system such as a kiosk system, according to other specific embodiments.
Figure 6H:
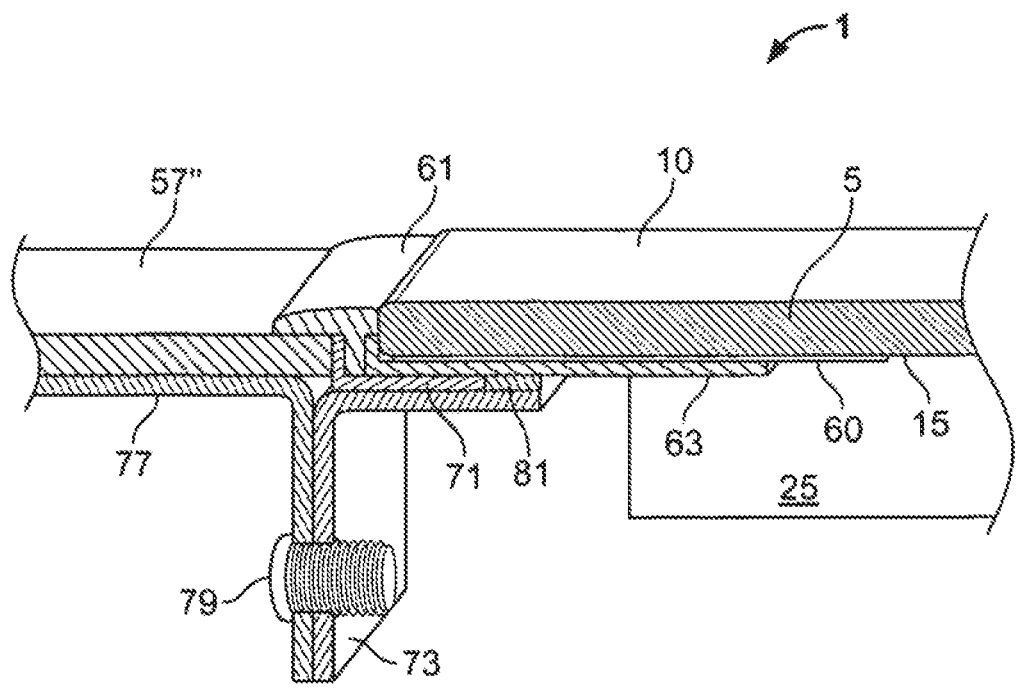

FIG. 6(g) and FIG. 6(h) illustrate partial cross-sectional slice perspective views of two other sealing schemes for a bezel-less acoustic touch device shown mounted as part of another system such as a kiosk system, according to other specific embodiments. The description of elements shown in FIGS. 6(*g*)-6(*h*) that are the same as shown in FIGS. 6(*e*)-6(*f*) is not repeated here. The embodiment of FIG. 6(*g*) is similar to the embodiment shown in FIG. 6(*e*)-6(*f*), except that the frame 57' has a thickness that is thin enough so that it may rest on the top wiper blade portion of gasket 61, exposing only a minimal amount, such as about 1 mm width, of gasket 61 between substrate 5 and frame 57'. Brackets 77 and 73 may be coupled together via an appropriately dimensioned spacer 83 (if needed) with fastener 79, so as to provide adequate mounting of the touch sensor 1 to the frame 57'. The embodiment of FIG. 6(*h*) is also similar to the embodiment of FIGS. 6(*e*)-6(*f*), as frame 57" may be of variable thickness, except that this embodiment is suitable even when the edges of frame 57" may be rough rather than smooth finished edges. In the embodiment of FIG. 6(*h*), the wiper blade portion of gasket 61 may be disposed on top of the frame 57" to cover its rough edges and provide good sealing as well as the other advantages discussed for the other embodiments.

The specific embodiment of FIGS. 2(*a*) and 2(*b*), described above, provides an XY surface acoustic wave touch sensor capable of detecting touches on nominal touch region 13, as well as on peripheral region 14 external to nominal touch region 13 on front surface 10 and/or touches on the curved connecting surface 20. However, when a touch is made on peripheral region 14 or on curved connecting surface 20, the XY touch sensor according to this specific embodiment can detect only one coordinate of position: either an X-coordinate or a Y-coordinate. If only the X-coordinate is detected from a touch to the top or bottom edge connecting surface 20 or the top or bottom portion of peripheral region 14, or if only the Y-coordinate is detected from a touch on either side edge connecting surface 20 or either side portion of peripheral region 14, there is a need for another coordinate or position data to resolve the ambiguity of which area (top, bottom, right or left) was touched. When edge sensitive touch functions are provided according to the present invention, this resolution can be done in various manners according to different embodiments described below. For purposes of the description herein, "edge sensitive touch functions" are intended to mean interactive touch functions based on detecting touches made to the peripheral region 14 and/or to curved connecting surface 20.

Figure 7:
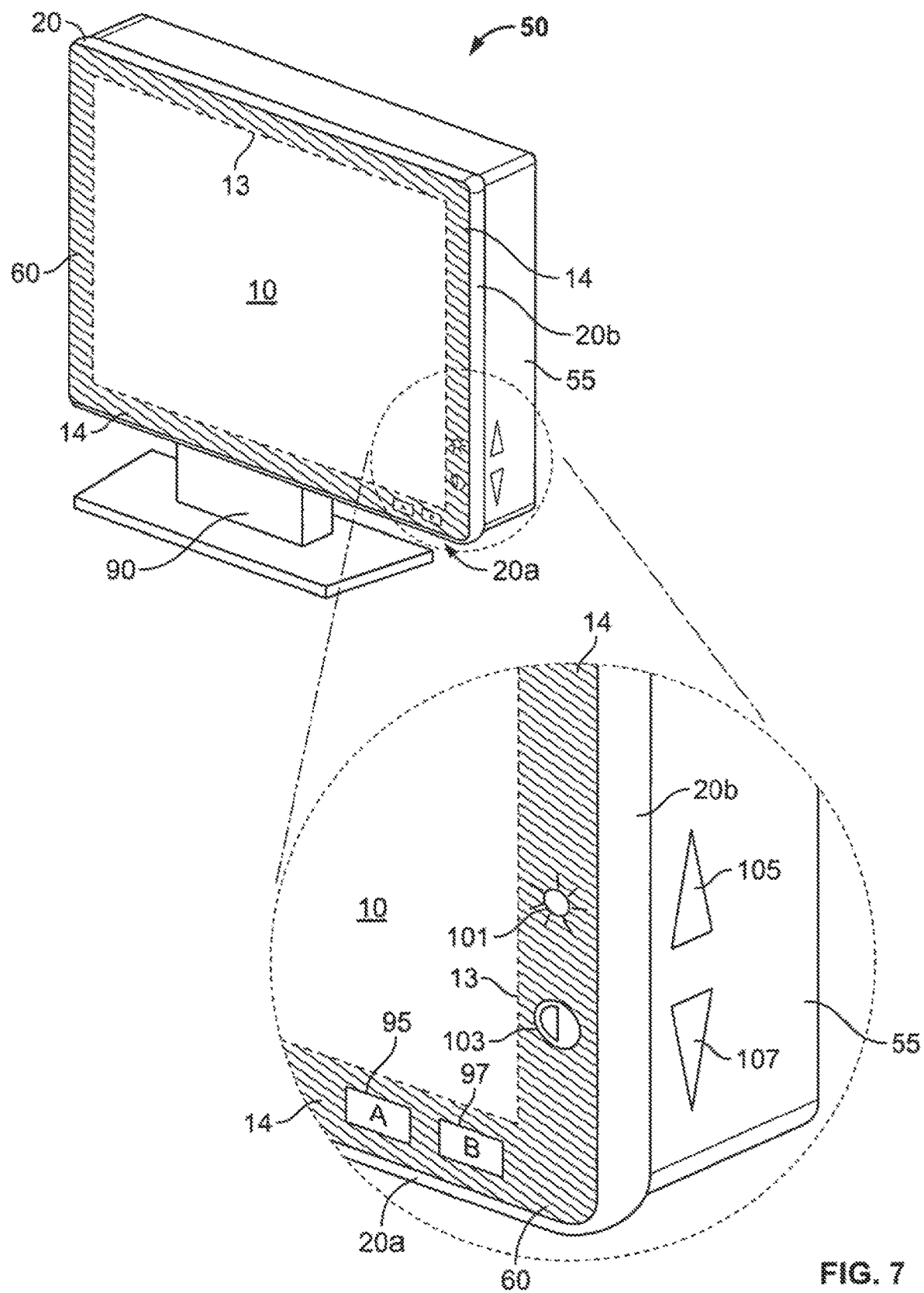
FIG. 7 is a perspective view of a bezel-less acoustic touch device, like a touch monitor, with edge sensitive touch functions, according to specific embodiments.

FIG. 7 is a perspective view of a bezel-less acoustic touch sensor device 50, such as a touch monitor, with edge sensitive touch functions as seen in a magnified bottom right corner view, according to specific embodiments of the invention. FIG. 7 includes the various elements already discussed in connection with touch sensor 1 of FIG. 1 and touch sensor 50 of FIG. 4, and those elements will not be described again here. Of course, it should be recognized that if the acoustic touch sensor is not integrated into a monitor but is instead integrated into a computer or a portable touch device, monitor stand 90 is not needed. As seen in FIG. 7, which provides a magnified corner view of touch sensor device 50, front surface and curved connecting surfaces 20*a* and 20*b* of substrate 5 are shown coupled to housing 55. Front surface includes peripheral region 14 (shown external to dotted lines defining a nominal touch region 13 (within dotted lines), which is disposed over display 25.

Certain edge sensitive touch functions may be detected by determining a touch on the appropriate part of peripheral region 14 or on curved connecting surface 20. Other edge sensitive touch functions may be detected by determining a gesture is occurring. With a gesture, when an initial touch on a part of peripheral region 14 or on curved connecting surface 20 is recognized, it is then observed if the perturbation in the received surface acoustic wave signal has a time delay that is increasing with sequential scans or decreasing with sequential scans as a signature that touch is a gesture, such as a sliding or swiping motion. With a gesture, the absolute coordinates of the position of the continuous touches may not matter, as long as the increase or decrease with time occurs after an initial touch is detected in the appropriate edge sensitive touch function region.

According to a specific embodiment, peripheral region 14 may have different icons or printed buttons, such as in this example shown box 95, box 97, icon 101 and/or icon 103, that are provided as part of layer 60 (which could be disposed on back surface 15 or front surface of substrate 5, according to various embodiments). Since acoustically benign layer 60 may be opaque and use a combination of colors including black, white and/or other colors, the particular icons or boxes designating buttons or other edge touch sensitive functions on the peripheral region 14 may be customized. Therefore, a touch detected on the appropriate part of peripheral region 14 would result in the designated function action, as mapped by the system control software and/or firmware. Alternately or in addition, touches detected on curved connecting surfaces 20*a* and/or 20*b* could be used to result in the designated function action. Where the edge touch detection capability of connecting surface 20 is used, surface 20 itself may have a thin layer of material (similar to layer 60) thereon to designate the appropriate edge sensitive touch function, or housing 55 proximate to the relevant portion of connecting surface 20 may have printed icons such as increasing arrow 105 or decreasing arrow 107 to indicate a desired increasing or decreasing, respectively, of the device volume, display brightness, display contrast, or other designated or configurable edge sensitive function. The portion of surface 20 proximate to arrows 105 and 107 may be touched in a sliding motion to provide a sliding control of an aspect of the device.

Buttons 95 and 97 may be assigned predetermined functions (such as on/off, or awake from sleep mode, or other operation) or such functions may be configurable by a user or manufacturer of the device 50 using configuration software to map the particular touch region to a particular function. As a further example, the icon 101 (indicated as a sun for display brightness adjustment) on peripheral region 14 may be touched to indicate to the device controller that the proximate part of curved connecting surface 20 may be slidably touched to increase or decrease the display brightness. As a still further example, the icon 103 (indicated as a half darkened circle for display contrast adjustment) on peripheral region 14 may be touched to indicate to the device controller that the proximate part of curved connecting surface 20 may be slidably touched to increase or decrease the display contrast. It is clear that a microphone icon could be similarly provided to enable volume control. Alternatively, the arrows 105 and 107 could be configured to cause two-finger touches as zooming in or out of an image on display 25, or scrolling of images on display 25, etc.

Although various icons and buttons are shown in one corner of device 50 in the example shown in FIG. 7, it is recognized that one, all, or a combination of the icons or buttons may be used for edge sensitive touch functions. For instance, for some embodiments, there is not necessarily any need to have both increasing arrow 105 and decreasing arrow 107, but one might suffice. Further, many different edge sensitive touch functions than those described above could be enabled by the edge sensitive touch function features of the present invention, according to various embodiments. It should be recognized that although FIG. 7 illustrates 20b and region 14b as being on the right side of device 50 (as FIG. 7 serves to provide mere examples of the types of edge sensitive touch functions), surface 20b and region 14b shown in FIGS. 11(a)-11(d) are on the left side of device 50. However, surface 20b and region 14b of FIG. 7 may be situated on the right or left side of device 50, depending on the specific embodiment. That is, the location of the edge sensitive touch functions can be available on peripheral region 14 and/or surface 20 any of the top, bottom, right side or left side, or any combination thereof, by using different specific embodiments according to the invention.

Various other specific embodiments are now described that have similar operation as described above in connection with FIGS. 2(a) and 2(b) for detecting the X-Y coordinates for a touch on nominal touch region 13, and that description is not repeated here. The aspects of these embodiments that are to be described focus on providing another coordinate or additional position data to resolve the ambiguity of the area touched (top, bottom, left or right) when edge sensitive touch functions are provided according to the present invention.

Figure 8A:
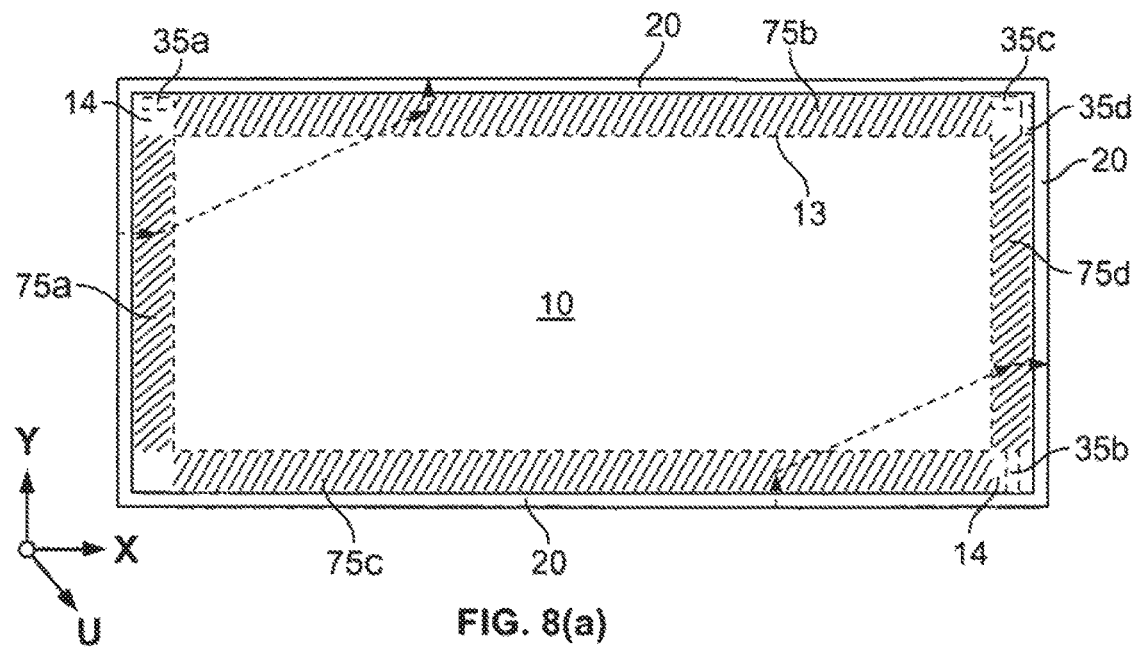
FIG. 8(a) and FIG. 8(b), respectively, are front and back views of the substrate of an acoustic touch sensor, according to another specific embodiment.
Figure 8B:
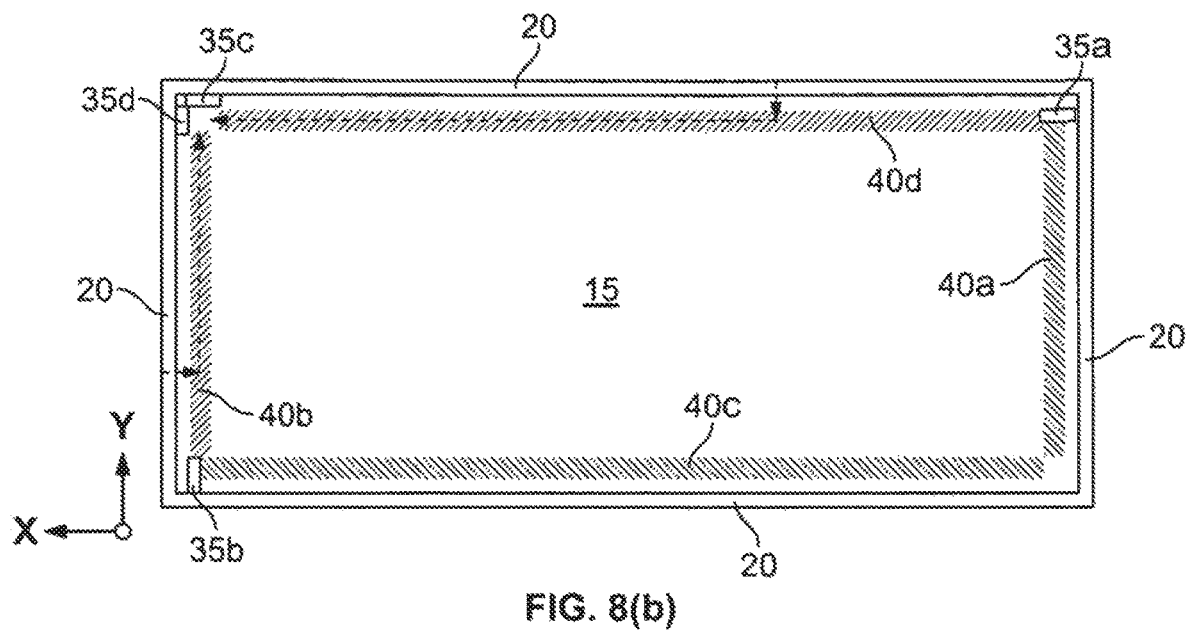
Figure 9A:
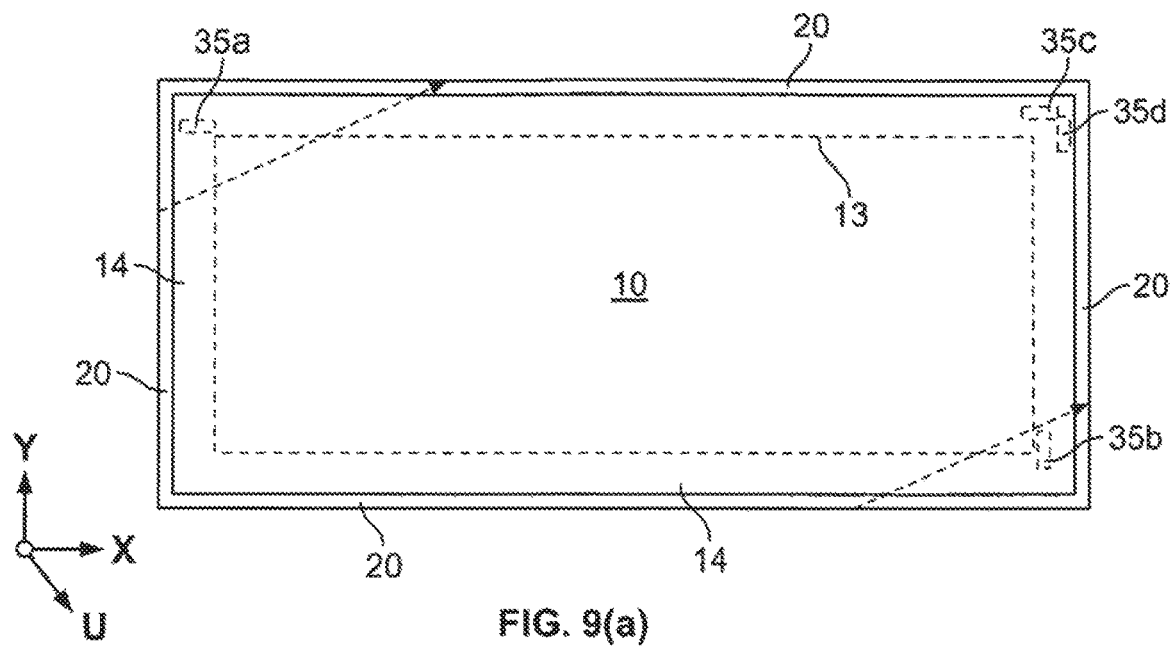
FIG. 9(a) and FIG. 9(b), respectively, are front and back views of the substrate of an acoustic touch sensor, according to yet another specific embodiment.
Figure 9B:
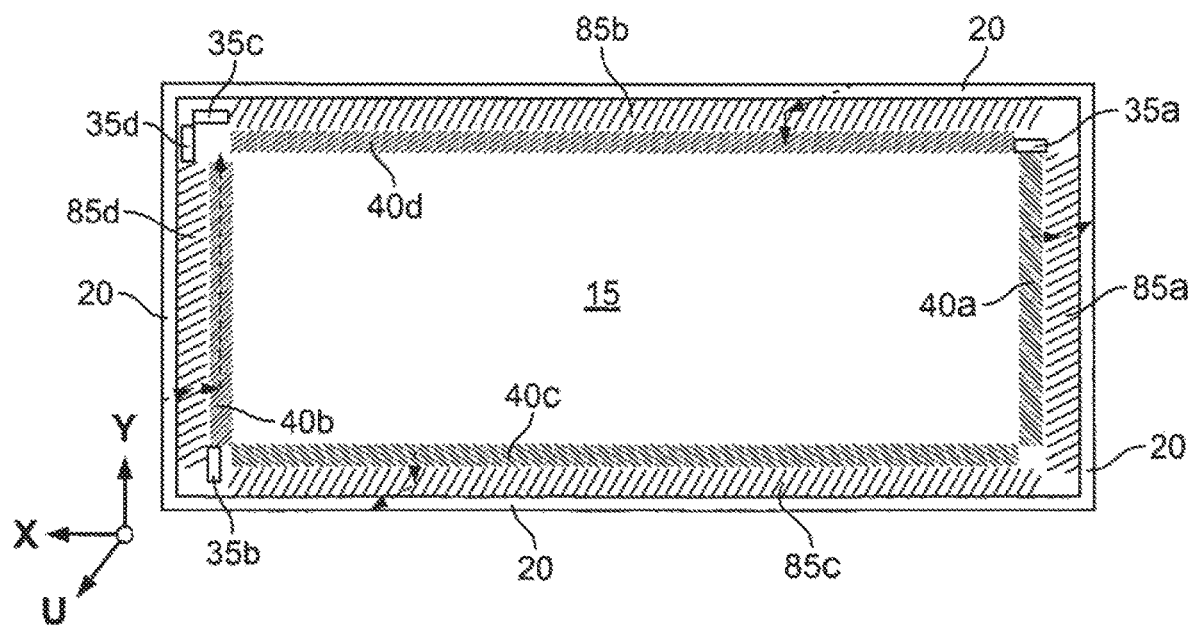
Figure 10A:
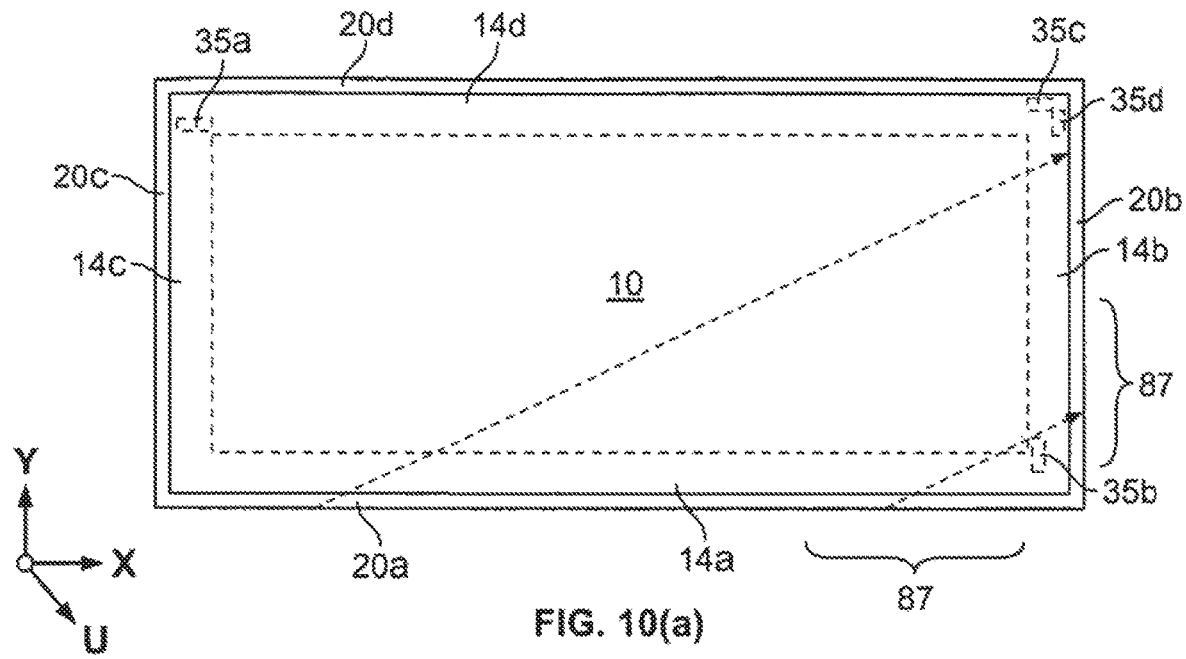
FIG. 10(a) and FIG. 10(b), respectively, are front and back views of the substrate of an acoustic touch sensor, according to still yet another specific embodiment.
Figure 10B:
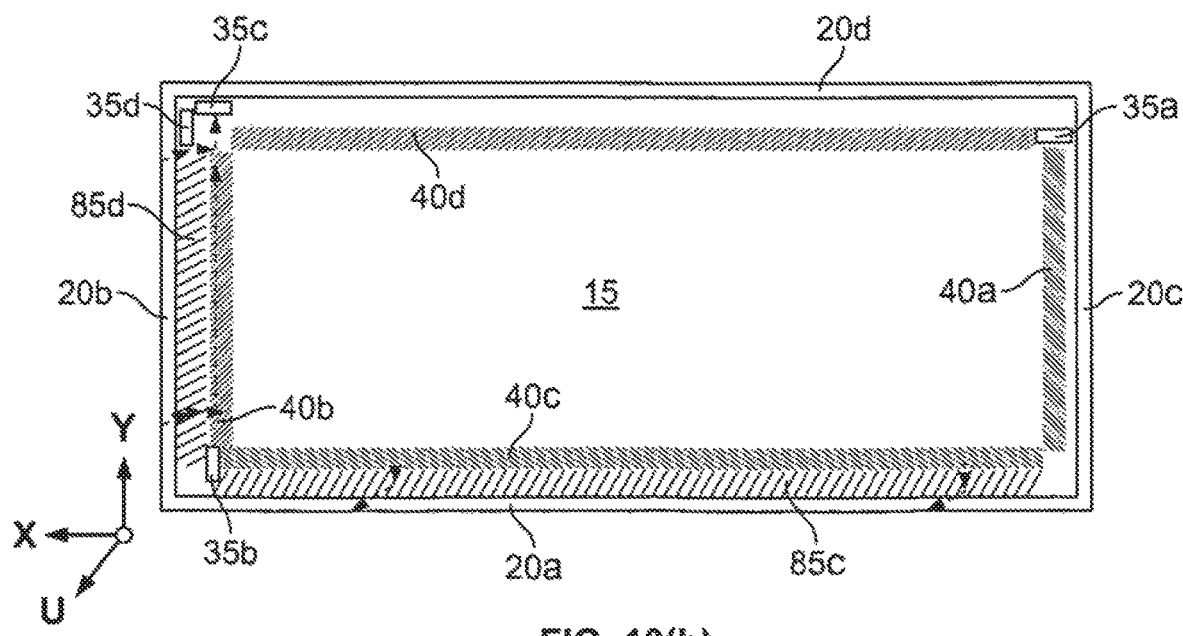

FIG. 8(a) and FIG. 8(b), respectively, are front and back views of substrate 5 of an acoustic touch sensor, according to a specific embodiment of the invention. FIG. 9(a) and FIG. 9(b), respectively, are front and back views of substrate 5 of another acoustic touch sensor, according to another specific embodiment. FIG. 10(a) and FIG. 10(b), respectively, are front and back views of substrate 5 of an acoustic touch sensor, according to a further specific embodiment. As was the case with FIGS. 2(a) and 2(b), transducers 35 in FIGS. 8(a), 9(a) and 10(a) are shown in dotted line to provide a frame of reference, respectively, in relation to FIGS. 8(b), 9(b) and 10(b), which are plan views of back surface 15 of the acoustic touch sensor where transducers 35 are shown in solid line. To provide a further frame of reference, X-Y coordinate axes and, where relevant, U-coordinate axis are shown in FIGS. 8(a), 8(b), 9(a), 9(b), 10(a) and 10(b). The U-coordinate is a coordinate in the same plane as X and Y but in a tilted direction. Measuring X, Y and U coordinates of touches provides a degree of redundancy in position measurement that is needed for high performance dual touch or multiple simultaneous touch applications. As will be discussed below, the addition of U-coordinate measurement capability provides additional benefits for bezel-less acoustic touch devices.

FIG. 8(a) and FIG. 8(b), respectively, are front and back views of substrate 5 of an acoustic touch sensor, according to a specific embodiment of the invention. The embodiment of FIGS. 8(a) and 8(b) is structurally similar to, and operates similarly for detecting a touch in nominal touch region 13 as described above for FIGS. 2(a) and 2(b). Additional aspects of the specific embodiment of FIGS. 8(a) and 8(b) will be described. In this specific embodiment, unlike the embodiment of FIGS. 2(a) and 2(b), four beam splitters 75 are provided on front surface of substrate 5. The specific embodiment of FIGS. 8(a) and 8(b) therefore uses the U-coordinate axis to provide an XYU surface acoustic wave touch sensor capable of reliably detecting multiple touches on nominal touch region 13, on peripheral region 14 external to nominal touch region 13 on front surface, and/or touches on the curved connecting surface 20. Edge sensitive touch functions may be implemented on peripheral region 14 and/or curved connecting surface 20.

As seen in FIGS. 8(a) and 8(b), beam splitters 75 deflect a portion of the incident surface acoustic wave beam in a direction perpendicular to the U-coordinate axis while leaving another portion undeflected. Beam splitter 75 may be fabricated on front surface of substrate 5 by, for example, screen printing glass frit or composite polymer material inks, or alternatively by etching grooves. Each beam splitter 75 has multiple deflecting elements, which may be parallel reflector segments that are rotated by a defined angle (for a predefined aspect ratio system, such as a 4:3 aspect ratio) with respect to vertical and spaced along the axis of the beam splitter with a center-to-center spacing of the surface acoustic wavelength divided by the sine of the difference of 90 degrees and the defined angle. The deflecting elements of top and bottom beam splitters 75b and 75c have a first defined angle, and the deflecting elements of side beam splitters 75a and 75d have a second defined angle (different than the first defined angle). The acoustic wave incident on the beam splitter deflecting element is coherently deflected at a predetermined angle relative to the axis of the beam splitter, where the angle of reflection equals the angle of incidence. It should be recognized that the beam splitter's deflecting element angle can be varied for other embodiments, depending on the geometry of the substrate dimensions and aspect ratio, and further details regarding such acoustic wave beam splitters may be found in connection with at least FIGS. 4-6 of U.S. Patent Application Publication 2008/0266266A1, the entirety of which is incorporated by reference herein. An angle perpendicular to the predefined angle of the deflecting elements of beam splitters 75a and 75d defines the U-coordinate axis.

It is noted that some specific embodiments having exposed beam splitters 75 on front surface 10 of substrate 5 may be cosmetically undesired and lead to durability or wear issues. If lead-based ceramic frits are used, there is also a risk that exposed frits of beam splitters 75 may be dissolved by acids such as acidic soft drinks and potentially expose users to lead poisoning. If beam splitters 75 are fabricated of lead-based frits it may be desirable that they be covered with a sealant. Alternatively non-lead based materials may be used including composite polymer inks or non-lead-based higher cure temperature material frits and ablated grooves which optimally are backfilled with a frit or other material.

In operation, the portion of surface acoustic beam reflected from transmitting transducer 35a by array 40a traveling around curved connecting surface 20 to be incident on beam splitter 75a gets partially deflected (U1 beam) along a line of a constant coordinate U, while the undeflected portion proceeds as previously described to detect the Y-axis coordinate of a touch. As seen by the dotted line arrows indicating the U sensing wave travel paths in FIGS. 8(a) and 8(b), the partially deflected portion of the U1 beam travels along the line of that constant coordinate U on front surface 10 and is incident on beam splitter 75b, which deflects the portion of the beam around curved connecting surface 20 to back surface 15 where reflecting array 40d reflects the beam portion to receiving transducer 35d. Thus, receiving transducer 35d also acts as U1-signal receiving transducer, in addition to acting as X-coordinate signal receiving transducer. The U1 signal measures the U coordinate for one portion of the touch area.

Similarly, the portion of surface acoustic beam reflected from transmitting transducer 35b by array 40c traveling around curved connecting surface 20 to be incident on beam splitter 75c gets partially deflected (U2 beam) along a line of constant coordinate U, while the undeflected portion proceeds as previously described to detect the X-axis coordinate of a touch. As seen by the dotted line arrows indicating the U sensing wave travel paths in FIGS. 8(a) and 8(b), the partially deflected portion of the U2 beam travels along the line of constant coordinate U on front surface 10 and is incident on beam splitter 75d, which deflects the portion of the beam around curved connecting surface 20 to back surface 15 where reflecting array 40b reflects the beam portion to receiving transducer 35c. Thus, receiving transducer 35c also acts as U2-signal receiving transducer, in addition to acting as the Y-coordinate signal receiving transducer. The U2 signal measures the U coordinate for a portion of the touch area not covered by the signal U1.

The system controller analyzes the received signals along the time base, to detect indicated coordinates of the touch (which occurs where the travel paths shown in FIG. 2(a) intersect) within nominal touch region 13 on front surface 10. Further, the system controller analyzes the received signals along the time base, to detect indicated coordinates of any touch that occurs on peripheral region 14 on front surface 10 or on connecting surface 20 based on the travel paths shown in FIGS. 8(a) and 8(b). Thus, the use of the U-coordinate signal not only provides coordinate measurement redundancy for robust multiple touch operations, but also enables the device controller to distinguish edge sensitive touch functions that may be provided.

FIG. 9(a) and FIG. 9(b), respectively, are front and back views of substrate 5 of an acoustic touch sensor, according to further specific embodiments of the invention. The embodiment of FIGS. 9(a) and 9(b) is structurally similar to, and operates similarly for detecting a touch in nominal touch region 13 as, the embodiment described above for FIGS. 2(a) and 2(b), and that description will not be repeated. Instead, additional aspects of the specific embodiment of FIGS. 9(a) and 9(b) will be described. To provide a further frame of reference, X-Y-U coordinate axes are shown in FIGS. 9(a) and 9(b). In this specific embodiment, unlike the embodiment of FIGS. 2(a) and 2(b) and FIGS. 8(a) and 8(b), four beam splitters 85 are provided on back surface 15 of substrate 5. The specific embodiment of FIGS. 9(a) and 9(b) therefore provides another example of an XYU surface acoustic wave touch sensor capable of reliably detecting multiple touches on nominal touch region 13 and distinguishing touches on curved connecting surfaces 20 or peripheral region 14 that may be provided with touch input edge functions such as described above.

Similar to beam splitters 75 discussed above, beam splitters 85 deflect a portion of the incident surface acoustic wave beam in the U direction while leaving another portion undeflected. According to this specific embodiment, beam splitters 85 may be fabricated on back surface 15 (directly without layer 60 or via layer 60, according to various embodiments) of substrate 5. With specific embodiments having beam splitters 85 on back surface 15, there are no cosmetic issues with visibility and no durability and/or safety concerns, as the exposed beam splitter frits are protected within and by housing 55.

In operation, the portion of surface acoustic beam reflected from transmitting transducer 35a by array 40a is incident in the negative (−) X-direction on beam splitter 85a, is partially deflected (U1 beam) and travels around curved connecting surface 20 along a line of constant U, while the undeflected portion proceeds as previously described to detect the Y-axis coordinate of a touch. As seen by the dotted line arrows indicating the U sensing wave travel paths in FIGS. 9(a) and 9(b), the partially deflected portion of the U1 beam travels along the line of constant value U on front surface 10 and travels around curved connecting surface 20 to back surface 15, to be incident on beam splitter 85b, which deflects the portion of the beam in the negative (−) Y-direction to reflecting array 40d which reflects the beam portion in the positive (+) X-direction to receiving transducer 35d. Thus, receiving transducer 35d also acts as U1-signal receiving transducer, in addition to acting as X-coordinate signal receiving transducer.

Similarly, the portion of surface acoustic beam reflected from transmitting transducer 35b by array 40c is incident in the negative (−) Y-direction on beam splitter 85c, is partially deflected (U2 beam) and travels around curved connecting surface 20 along a line of constant value U, while the undeflected portion proceeds as previously described to detect the X-axis coordinate of a touch. As seen by the dotted line arrows indicating the U sensing wave travel paths in FIGS. 9(a) and 9(b), the partially deflected portion of the U2 beam travels along the line of constant value U on front surface 10 and travels around curved connecting surface 20 to back surface 15, to be incident on beam splitter 85d, which deflects the portion of the beam in the negative (−) X-direction to reflecting array 40b which reflects the beam portion in the positive (+) X-direction to receiving transducer 35c. Thus, receiving transducer 35c also acts as U2-signal receiving transducer, in addition to acting as Y-coordinate signal receiving transducer.

The system controller analyzes the received signals along the time base, to detect indicated coordinates of the touch (which occurs where the travel paths shown in FIG. 2(a) intersect) within nominal touch region 13 on front surface. Further, the system controller analyzes the received signals along the time base, to detect indicated coordinates of any touch that occurs on peripheral region 14 on front surface 10 or on connecting surface 20 based on the travel paths shown in FIGS. 9(a) and 9(b).

Further details on various types of XYU-type touch sensors are described, for example, in the disclosures of U.S. Pat. No. 5,854,450 and U.S. Published Patent Application 2008/0266266, which are incorporated by reference. With another example of an Adler-type acoustic touch sensor, folded acoustic paths may be used in order to further reduce the number of transducers, such as described in U.S. Pat. Nos. 4,700,176; 5,072,427; 5,162,618; and 5,177,327; each of which is incorporated herein by reference. It should be recognized that the present invention may be generalized to these different types of XYU-type touch sensors and/or touch sensors having reduced numbers of transducers. For example, an XYU-type touch sensor having a U array superposed on the X-Y reflective element arrays, or an XYU-type touch sensor having separate reflective arrays and adjacent beam splitters, may be used in specific embodiments of the invention.

FIG. 10(a) and FIG. 10(b), respectively, are front and back views of substrate 5 of an acoustic touch sensor, according to still further specific embodiments of the invention. The embodiment of FIGS. 10(a) and 10(b) is structurally similar to, and operates similarly for detecting a touch in nominal touch region 13 as, the embodiment described above for FIGS. 2(a) and 2(b). Additional aspects of the specific embodiment of FIGS. 10(a) and 10(b) will be described. To provide a further frame of reference. X-Y-U coordinate axes are shown in FIGS. 10(a) and 10(b). In this specific embodiment, unlike the embodiment of FIGS. 2(a) and 2(b) and FIGS. 9(a) and 9(b), only two beam splitters 85 are provided on back surface 15 of substrate 5. The specific embodiment of FIGS. 10(a) and 10(b) therefore provides an XY surface acoustic wave touch sensor capable of detecting touches in nominal touch region 13 and distinguishing touches on curved connecting surface 20 and/or peripheral region 14 that may be provided with edge sensitive touch functions described above.

According to this specific embodiment, only two beam splitters 85 are fabricated on back surface 15 (directly without layer 60 or via layer 60, according to various embodiments) of substrate 5.

In operation, the portion of surface acoustic beam reflected from transmitting transducer 35a by array 40a travels in the negative (−) X-direction, travels around curved connecting surface 20, and proceeds as previously described to detect the Y-axis coordinate of a touch. As seen by the dotted line arrows indicating the U sensing wave travel paths in FIGS. 10(a) and 10(b), two U beams (similar to the U2 beam described for FIGS. 9(a) and 9(b)) but with different U values), in order to show the general range of U values along bottom curved connecting surface 20a and the side curved connecting surface 20b. The portion of surface acoustic beam reflected from transmitting transducer 35b by array 40c is incident in the negative (−) Y-direction on beam splitter 85c, is partially deflected and travels around curved connecting surface 20a along a line of constant value U, while the undeflected portion proceeds as previously described to detect the X-axis coordinate of a touch. The partially deflected portion of U beam travels along the line of constant value U on front surface 10 and travels around curved connecting surface 20b to back surface 15, to be incident on beam splitter 85d, which deflects the portion of the beam in the negative (−) X-direction to reflecting array 40b which reflects the beam portion in the positive (+) X-direction to receiving transducer 35c. Thus, receiving transducer 35c also acts as the U-coordinate signal receiving transducer, in addition to acting as Y-coordinate signal receiving transducer.

The system controller analyzes the received signals along the time base, to detect indicated coordinates of the touch (which occurs where the travel paths shown in FIG. 2(a) intersect) within nominal touch region 13 on front surface. Further, the system controller can analyze the received signals along the time base, to detect indicated coordinates of any touch that occurs on peripheral region 14a and/or 14b on front surface 10 or on connecting surface 20a and/or 20b, based on the travel paths shown in FIGS. 10(a) and 10(b). In particular, the presence of the U signal on surface 20a or region 14a in connection with only a detected X-coordinate signal (i.e., no detected Y-coordinate signal) will enable edge sensitive touch functions where the U signal is present. If there is an absence of the U signal on surface 20 or region 14a in connection with only the detected X-coordinate signal, then the device controller will be able to distinguish edge sensitive touch functions as being those on region 14d or surface 20d. The device similarly can distinguish edge sensitive touch functions detected as being on either region 14b or 20b, from those of region 14c or 20c, by using absence or presence of the U signal in connection with only a Y-coordinate signal (i.e., no detected X-coordinate signal) being detected.

Of course, it should be recognized that in other embodiments, the use of two beam splitters (85b and 85a, as seen in FIG. 9(b)) on back surface 15 may differ from those (85c and 85d) shown in FIGS. 10(a) and 10(b) so that certain curved connecting surfaces 20 (opposite from 20a and 20b) and their respectively proximate portions of peripheral region 14 may be distinguished to provide the edge sensitive touch detection functions.

Further, it should be recognized that the embodiment of FIGS. 8(a)-8(b) having four beam splitters on front surface 10 can be altered for still another embodiment that has two beam splitters (either 75a and 75b, or 75c and 75d) on front surface 10 (in a similar manner as the embodiment of FIGS. 10(a)-10(b) used two beam splitters (85c and 85d) on back surface 15) in order to provide edge sensitive touch functions in another example of an XY sensor. It also should be recognized that having beam splitters that extend only partially along the peripheral corner edge of the sensor (for example, 85d and 85c being truncated so that there are only parts of 85d and 85c closest to the corner near transducer 35b that are formed), and not along the entire length of proximate reflect arrays, would merely result in the edge sensitive touch function parts of region 14 and/or surfaces 20a and 20b being spatially limited to regions indicated by brackets 87, in accordance with another specific embodiment. This would be similarly the case if the beam splitters 75d and 75c were formed similarly truncated in the embodiment shown in FIGS. 8(a) and 8(b). That is, the edge sensitive touch functions would be limited spatially to the bottom right corner of peripheral region 14 and connecting surface 20, such as shown in FIG. 7. In yet another embodiment, it is possible to modify the embodiments of FIG. 8, 9 or 10 to use only one beam splitter 75 or 85 along one edge (e.g., top, left, right or bottom) of substrate 5, such that at least one peripheral region 13 and/or its corresponding curved connecting surface 20 are provided with edge sensitive touch functions.

For simplicity of discussion for FIG. 7, the edge sensitive touch functions described and/or shown are illustrated as being on side curved connecting surface 20b and bottom curved connecting surface 20a and/or on those portions of peripheral region 14 proximate to 20a and 20b. However, it should be emphasized that device 50 can have the edge sensitive touch function capability available anywhere on curved connecting surface 20 and/or on peripheral region 14, according to various specific embodiments. This is because the U-coordinate signal is used in conjunction with either the X-coordinate or the Y-coordinate to determine the touch input applied to any edge sensitive functions.

FIGS. 11(a), 11(b), 11(c) and 11(d) illustrate another specific embodiment for an acoustic XY sensor that resolves the ambiguity issue in portions of peripheral region 14 (but not curved connecting surface 20). This embodiment does not measure a U-coordinate, but rather extends the X-coordinate or Y-coordinate signals for detecting touches into portions of peripheral region 14. This specific embodiment changes the placement of reflective arrays 40 and transducers 35 from those shown in FIGS. 2(a) and 2(b). In particular, transducers 35a and 35c are moved in the negative (−) Y-axis direction, transducers 35b and 35d are moved in the negative (−) X-axis direction. Further, reflecting array 40d is extended over transducer 35a, reflective array 40b is extended to be behind transducer 35b, and reflective arrays 40a and 40c are extended to join at their intersecting corner. That is, there is a reflector element common to two reflective arrays.

Figure 11A:
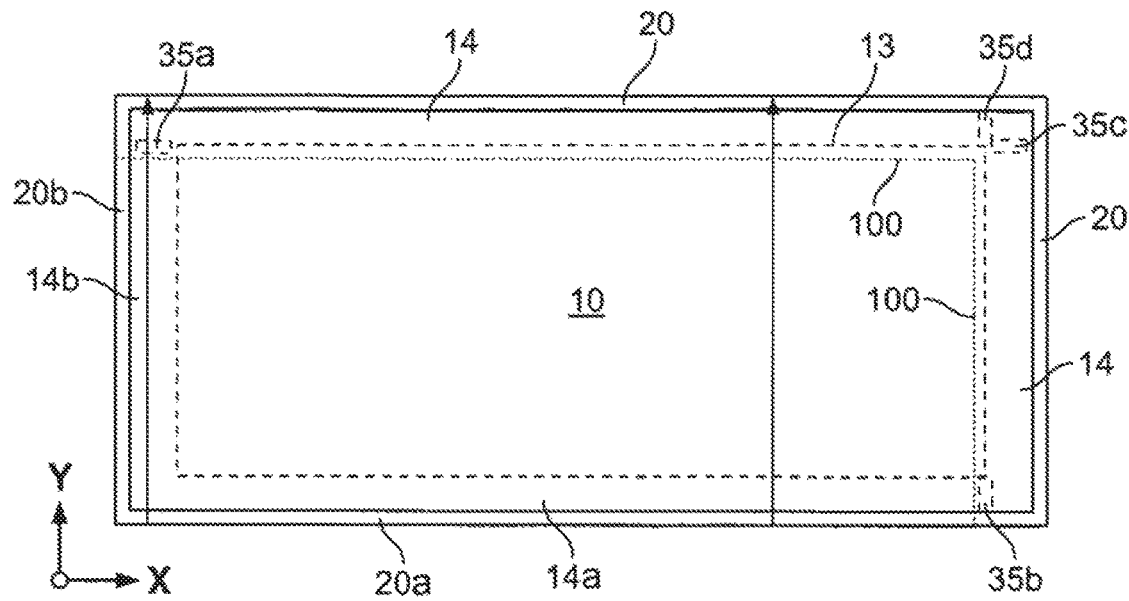
FIGS. 11(a) and 11(c), and FIGS. 11(b) and 11(d), respectively, are front and back views of the substrate of an acoustic touch sensor, according to another specific embodiment.
Figure 11B:
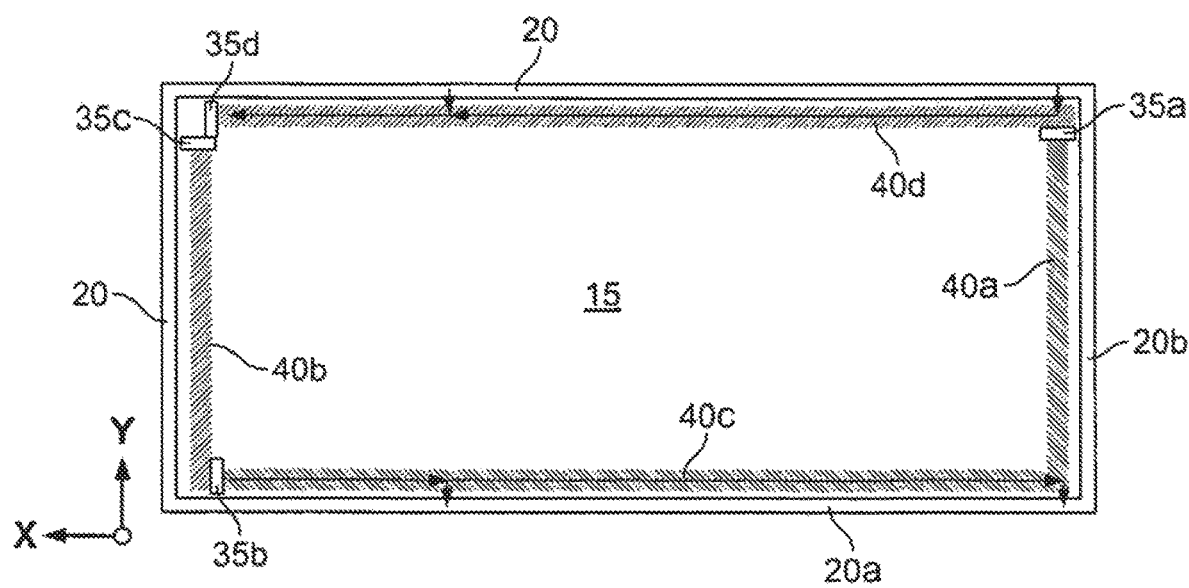

In detecting XY data for a touch in nominal touch region 13, this specific embodiment shown in FIGS. 11(a)-11(d) operates similarly as already described for FIGS. 2(a)-2(b) and that description is not repeated here. FIGS. 11(a) and 11(b) are useful to describe the operation of a touch to the edge sensitive functions on peripheral region 14a (a touch on curved connecting surface 20a remains ambiguous as it produces the same signal as a touch on the top portion of curved connecting surface 20). FIGS. 11(a) and 11(b) show the possible acoustic wave travel paths (solid line arrows) for detecting an X-coordinate of a touch on nominal touch region 13 (similar to that shown in FIG. 2(a)) and an X-coordinate for a touch on peripheral region 14b. In particular, surface acoustic waves travel from transmitting transducer 35b along the negative (−) X-axis direction on which reflecting array 40c is provided near a peripheral edge of back surface 15 of substrate 5. As seen by the solid line arrows indicating the X-coordinate sensing wave travel paths in FIGS. 11(a) and 11(b), reflective array 40c couples or reflects part of the acoustic waves with a sensing wave; traveling from reflective array 40c outwardly along the negative (−) Y-axis direction toward and around the proximate connecting surface 20a of substrate 5, traveling along the positive (+) Y-axis direction across front surface, traveling toward and around the opposing curved connecting surface 20 toward in a negative (−) Y-axis direction reflective array 40d on back surface 15, and traveling along reflective array 40d in a positive (+) X-axis direction to receiving transducer 35d.

Figure 11C:
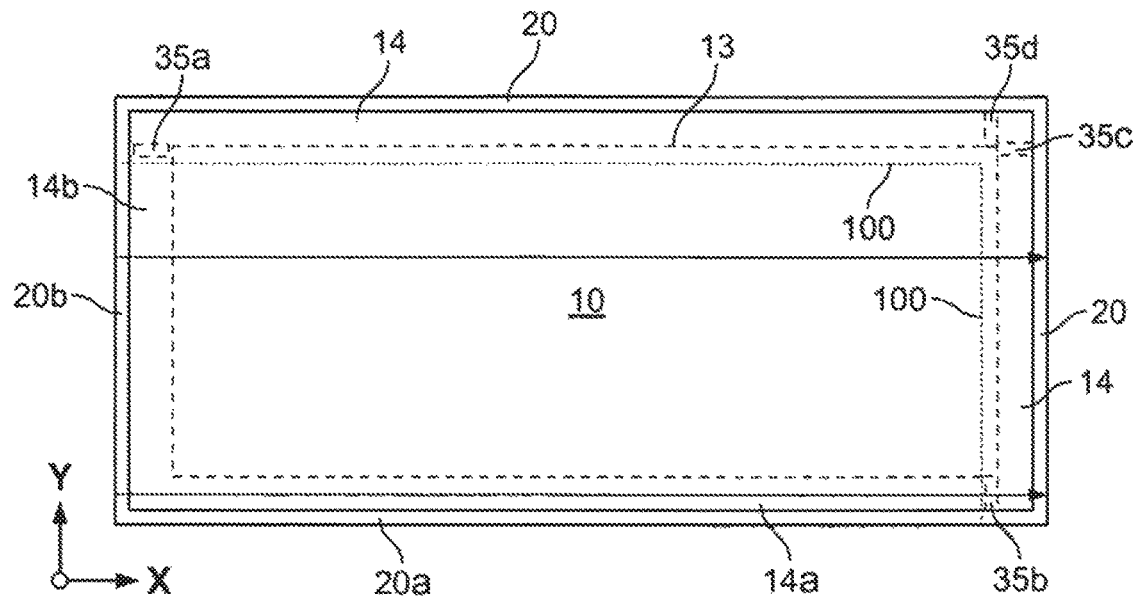
Figure 11D:
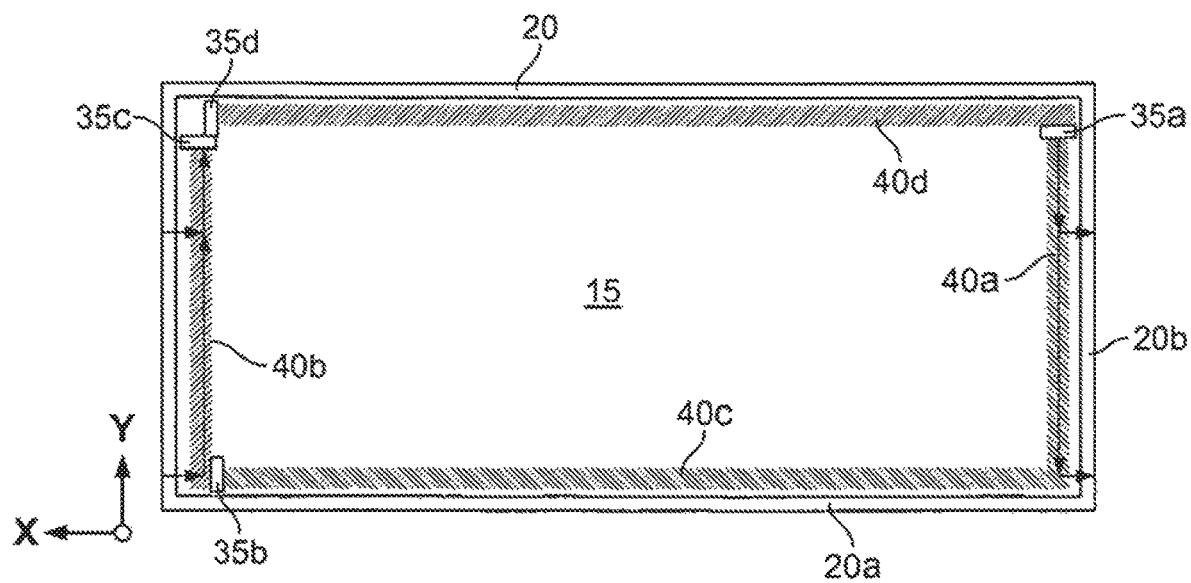

FIGS. 11(c) and 11(d) are useful to describe the operation of a touch to the edge sensitive functions on peripheral region 14b. (A touch on curved connecting surface 20b remains ambiguous as it produces the same signal as a touch on the opposite portion of curved connecting surface 20.) FIGS. 11(c) and 11(d) show the possible acoustic wave travel paths (solid line arrows) for detecting a Y-coordinate of a touch on nominal touch region 13 (similar to that shown in FIG. 2(a)) and a Y-coordinate for a touch on peripheral region 14b. In particular, surface acoustic waves travel from transmitting transducer 35a along the negative (−) Y-axis direction on which reflecting array 40a is provided near a peripheral edge of back surface 15 of substrate 5. As seen by the solid line arrows indicating the Y-coordinate sensing wave travel paths in FIGS. 11(c) and 11(d), reflective array 40a reflects part of the acoustic waves with a sensing wave: traveling from reflective array 40a outwardly along the negative (−) X-axis direction toward and around the proximate connecting surface 20b of substrate 5, traveling along the positive (+) X-axis direction across front surface, traveling toward and around the opposing curved connecting surface 20 to be incident in a negative (−) X-axis direction on reflective array 40b on back surface 15, and traveling along reflective array 40b in a positive (+) Y-axis direction to receiving transducer 35c.

The system controller analyzes the received signals along the time base, to detect indicated coordinates of the touch (which occurs where the travel paths shown in FIG. 2(a) intersect) within nominal touch region 13 on front surface. The system controller also analyzes the received signals along the time base, to detect indicated coordinates of any touch that occurs on peripheral region 14a and/or 14b on front surface 10, or on connecting surface 20a and/or 20b, based on the travel paths shown in FIGS. 11(a)-11(d).

Therefore, the specific embodiment illustrated in FIGS. 11(a)-11(d) results in peripheral region 14a and/or peripheral region 14b (below and to the left of dotted lines 100) which are outside of nominal touch region 13 being capable of processing edge sensitive touch functions.

Figure 12A:
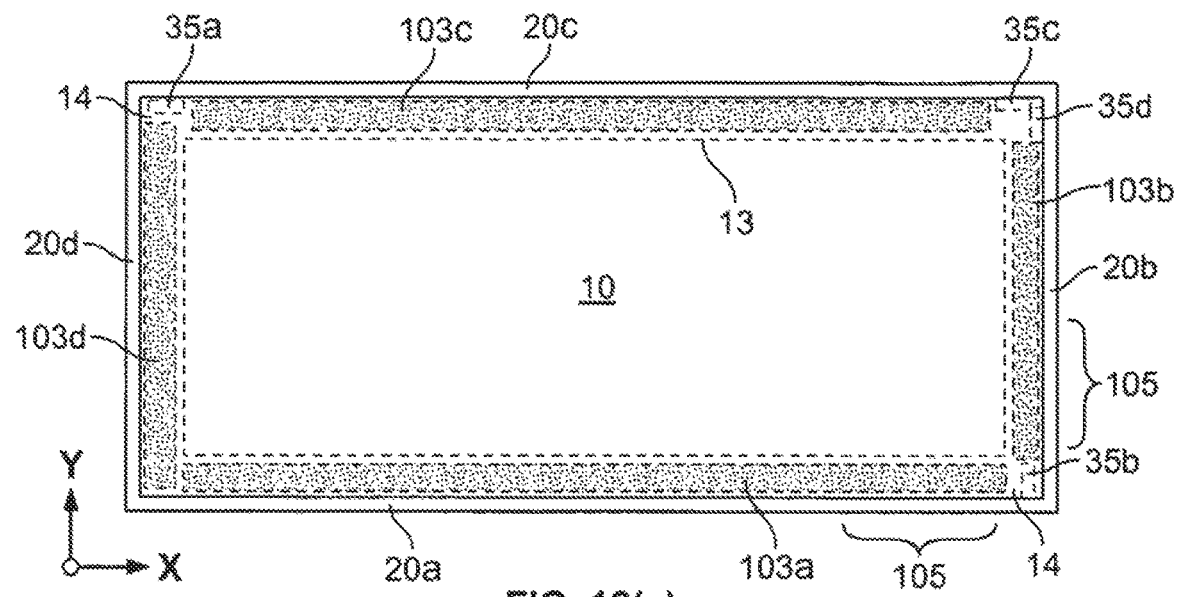
FIG. 12(a) and FIG. 12(b), respectively, are front and back views of the substrate of an acoustic touch sensor, according to yet further specifics embodiment.
Figure 12B:
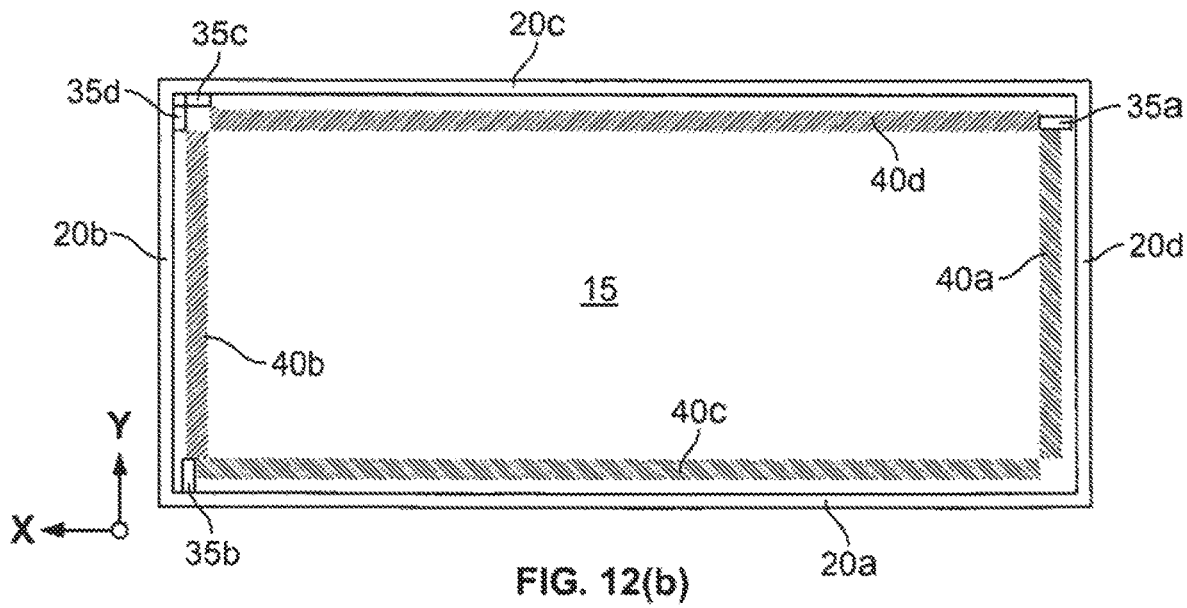

FIG. 12(a) and FIG. 12(b) illustrate another specific embodiment for an acoustic XY sensor having additional coordinate or position data to use in conjunction with the X-coordinate or Y-coordinate associated with the acoustically detected touch in peripheral region 14 and/or on curved connecting surface 20. This specific embodiment does not change the placement of reflective arrays 40 and transducers 35 from those shown in FIGS. 2(a) and 2(b), but instead adds one or more of a sensing electrode layer 103 to provide the additional position data. In detecting XY data for a touch in nominal touch region 13, this specific embodiment shown in FIGS. 12(a)-12(b) operates similarly as already described for FIGS. 2(a)-2(b) and that description is not repeated here.

Sensing electrodes 103 on device 50 sense the change in capacitance (or ohmic resistance in some embodiments) resulting from a touch that is made in peripheral region 14 and/or on connecting surface 20 provides the additional position data that is used in conjunction with the acoustically detected touch to provide edge sensitive touch functions. That is, electrode layer 103 may be used as a capacitive sensing electrode in some embodiments, and in other embodiments electrode layer 103 may be used as an ohmic sensing electrode.

Figure 12C:
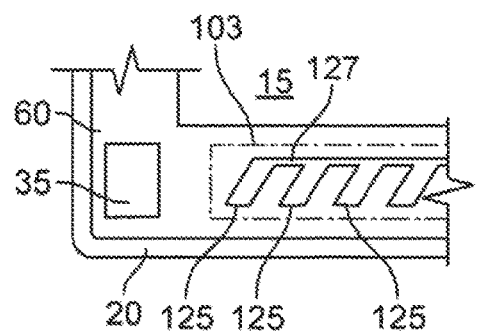
FIG. 12(c) is a magnified partial plan view of a corner of the back surface of the substrate of the acoustic touch sensor according to a specific embodiment associated with FIGS. 12(a) and 12(b)

According to specific embodiments, a possible layout of sensing electrode layers 103 are merely shown (in dotted outline) according to specific embodiments in FIG. 12(a). Although electrode layers 103 are shown as being on front surface 10 of FIG. 12(a), it should be noted that this may be the case only in some specific embodiments. In such embodiments where sensing electrode layer 103 is on front surface 10, layer 103 (usable as either a capacitive or ohmic sensing electrode) preferably is transparent, such as indium tin oxide (ITO), or other known transparent conductive material that may be screen printed or sputtered onto front surface 10. In other embodiments, layer 103 (used as capacitive sensing electrodes) may be directly (or via layer 60) on back surface 15 so as to be between substrate 5 and transducers/arrays/beam splitters thereon. If layer 60 is not used, then electrode layer 103 may be a transparent conductive material, but if layer 60 is used, then electrode layer 103 may be opaque and any type of conductive material that is acoustically benign, such as metal-containing material, that may be screen printed or sputtered onto layer 60. In another specific embodiment where electrode 103 is formed on layer 60 on back surface 10 of substrate 5, as shown in FIG. 12(c), which is a magnified partial plan view of a corner of back surface 15 of substrate 5, the reflecting elements 125 of reflecting array 20 (beam splitters 85 may be used, but are not shown in this figure for simplicity) are coupled together with at least a conductive lead 127. In this embodiment, the silver-containing glass frits 125 of array 20 serve not only as the reflective array but also, with the lead 127, as electrode 103 (indicated by the dotted-dash line) used for capacitive sensing. Lead 127 may be any conductive material that is acoustically benign, such as a thin line of the same material used to fabricate the reflecting elements 125. In another similar embodiment, reflecting elements 125 of reflective array 20 are coupled together with conductive lead 127 and optionally another similar lead (not shown) along the opposite end of reflecting elements 125.

Although four electrodes 103a, 103b, 103c and 103d are shown in FIG. 12(a), it should be recognized that having two capacitive electrodes (103a and 103b, or 103a and 103d, or 103b and 103c, or 103d and 103c) will be sufficient to provide the additional position data needed to address the ambiguity issue for providing edge sensitive touch functions on connecting surface 20 and/or peripheral region 14. In some embodiments, use of at least one electrode (for capacitive or ohmic sensing) is possible where only one peripheral region 13 and/or its corresponding curved connecting surface 20 is provided with edge sensitive touch functions, and some embodiments may have more than four capacitive electrodes 103 by splitting the electrodes 103 into smaller sizes, although the electrical connecting scheme for these electrodes 103 would become more complicated. It also should be recognized that having two capacitive electrodes 103 that extend only partially along the peripheral corner edge of the sensor (for example, 103a and 103b being truncated so that there are only parts of 103a and 103b closest to the corner near transducer 35b that are formed), and not along the entire peripheral edge of the sensor would merely result in the edge sensitive touch functional parts of region 14 and/or surfaces 20a and 20b being spatially limited to regions indicated by brackets 105, in accordance with another specific embodiment.

The system controller analyzes the received signals along the time base, to detect indicated coordinates of the touch (which occurs where the travel paths shown in FIG. 2(a) intersect) within nominal touch region 13 on front surface. For touches outside of nominal touch region 13, touches are detected and unambiguously recognized as top, bottom, left or right touches through a combination of acoustic and capacitive (or ohmic) measurements. The system controller, which is also coupled to the capacitive electrodes 103, analyzes the received signals to detect the presence of a touch proximate to any of the electrodes 103 indicating a touch with coordinates in peripheral region 14 on front surface 10 and/or on connecting surface 20. This determines whether the touch is top, bottom, right or left oriented. The coordinate along the selected perimeter sides is based on the acoustic beam travel paths shown in FIGS. 11(a)-11(d).

Various aspects of acoustic touch sensor devices according to specific embodiments of the invention have been described and shown. Many changes, modifications, variations, combinations, subcombinations and other uses and applications of the subject invention will, however, become apparent to those skilled in the art after considering this specification and the accompanying drawings which disclose the preferred embodiments thereof. For example, although the embodiments in the figures show curved connecting surface 20 as extending along the entire periphery of substrate 5, in other embodiments there may be two curved connecting surfaces 20 opposite each other when edge sensitive touch functions are only provided on up to two corresponding peripheral regions 14 and/or on up to two corresponding curved connecting surfaces 20. As another example, curved connecting surface 20 may be formed along most of the edge of substrate 5 except at corners, at which front surface 10 and back surface 15 are connected by sharp edges where corner bezel-like covers may be used. In another specific embodiment, substrate 5—having one transducer 35 (acting as both transmitter and receiver) and one reflecting array 40 formed on back surface 15—may have one curved connecting surface 20 provided opposite a sharp edged surface such that the transmitted surface acoustic waves from transducer 35 get reflected by reflecting array 40, travel around curved connecting surface 20 and across front surface 10, get reflected off the sharp edged surface, travel back across front surface 10 and around curved connecting surface 20, and get reflected by reflecting array 40 back to transducer 35 which receives the surface acoustic waves. In such an embodiment, edge sensitive touch functions might be provided only along one peripheral region 13 and/or its one corresponding curved connecting surface 20.

These and other changes, modifications, variations and other uses and applications, according to various specific embodiments, which do not depart from the spirit and scope of the invention are deemed to be covered, and limited only by the claims.

What is claimed:
1. A method, comprising:
propagating surface acoustic waves on a substrate, said substrate having a touch surface, a back surface, and a curved connecting surface formed between said touch surface and said back surface;
transmitting surface acoustic waves from at least one acoustic wave transducer via at least one beam splitter comprising a plurality of deflecting elements to at least one reflective array disposed on said back surface, or receiving surface acoustic waves at said at least one acoustic wave transducer from said at least one reflective array disposed on said back surface via said at least one beam splitter; and
scattering said surface acoustic waves at said at least one reflective array, such that said scattered surface acoustic waves are propagated between said back surface and said touch surface via said curved connecting surface.

2. The method according to claim 1, wherein said touch surface includes a nominal touch region and a peripheral region external to said nominal touch region, said peripheral region not covered by a bezel.

3. The method according to claim 2, wherein said substrate propagates perturbations of said surface acoustic waves, said perturbations capable of detection to determine a coordinate of a touch on said nominal touch region, on said peripheral region or on said curved connecting surface.

4. The method according to claim 3, wherein said perturbations are further capable of detection to generate touch coordinate data for said peripheral region or said curved connecting surface and initiate an edge sensitive touch function.

5. The method according to claim 4, further comprising providing a plurality of edge sensitive touch functions corresponding to different coordinates on said peripheral region or on said curved connecting surface.

6. The method according to claim 4, further comprising providing an icon indicating said edge touch sensitive function.

7. The method according to claim 1, wherein said at least one beam splitter is configured to deflect a portion of said surface acoustic waves between said at least one acoustic wave transducer and said at least one reflective array.

8. The method according to claim 7, further comprising disposing said at least one beam splitter on said back surface.

9. The method according to claim 1, wherein said substrate has a thickness T and said curved connecting surface joins said touch surface and said back surface via at least one curved section having a radius R ranging between about T/3 and about T/16.

10. The method according to claim 1, further comprising coupling said at least one acoustic wave transducer and said at least one reflective array to said back surface via an acoustically benign layer on said back surface.

11. The method according to claim 10, wherein said acoustically benign layer comprises an inorganic material.

12. The method according to claim 10, wherein said acoustically benign layer is opaque or translucent.

13. The method according to claim 2, further comprising:
providing at least one conductive electrode disposed near said peripheral region or said curved connecting surface.

14. The method according to claim 13, further comprising disposing said at least one conductive electrode on said back surface.

15. The method according to claim 14, wherein said at least one conductive electrode comprises reflective elements of said reflective array and a conductive lead coupling said reflective elements, wherein said at least one conductive electrode and said reflective elements are formed on said back surface via an acoustically benign layer.

16. The method according to claim 1, further comprising providing a second reflective array, wherein said second reflective array and said at least one reflective array share a common reflector element.

17. The method according to claim 1, further comprising providing an acoustically attenuating and optically transparent layer at said back surface.

18. The method according to claim 1, wherein said at least one reflective array is disposed opposite said touch surface on said back surface.

19. The method according to claim 2, wherein said at least one reflective array is disposed on said peripheral region of said back surface.

20. The method according to claim 1, wherein said at least one reflective array and said at least one acoustic wave transducer are both disposed on said back surface.

* * * * *